US009025058B2

(12) United States Patent
Hirai et al.

(10) Patent No.: US 9,025,058 B2
(45) Date of Patent: May 5, 2015

(54) IMAGE PROCESSING APPARATUS AND INFORMATION PROCESSING METHOD FOR IMPROVING RESOLUTION OF DIRECTION EXHIBITING DEGRADED RESOLUTION

(71) Applicant: Fujitsu Limited, Kawasaki-shi (JP)

(72) Inventors: Yukio Hirai, Akashi (JP); Hiroyasu Yoshikawa, Akashi (JP)

(73) Assignee: Fujitsu Limited, Kawasaki (JP)

( * ) Notice: Subject to any disclaimer, the term of this patent is extended or adjusted under 35 U.S.C. 154(b) by 170 days.

(21) Appl. No.: 13/863,497

(22) Filed: Apr. 16, 2013

(65) Prior Publication Data

US 2013/0342709 A1     Dec. 26, 2013

(30) Foreign Application Priority Data

Jun. 22, 2012   (JP) ................................. 2012-141394

(51) Int. Cl.
*G06T 5/00*     (2006.01)
*H04N 5/225*   (2006.01)

(52) U.S. Cl.
CPC ....... *G06T 5/003* (2013.01); *G06T 2207/10004* (2013.01); *H04N 5/225* (2013.01)

(58) Field of Classification Search
CPC ..................... G06T 2207/10004; G06T 5/003; H04N 5/225
USPC ................................ 348/222.1, 241, 273, 252
See application file for complete search history.

(56) References Cited

U.S. PATENT DOCUMENTS 8,306,348 B2   11/2012   Cohen et al.

FOREIGN PATENT DOCUMENTS

JP        2012-023498       2/2012

OTHER PUBLICATIONS

Fisher, R. et al., "Laplacian/Laplacian of Gaussian", 2003, XP002712723, Retrieved from the Internet: URL:http://homepages.inf.ed.ac.uk/rbs/HIPR2/log.htm, [retrieved on Sep. 12, 2013], the whole document, pp. 1-6.
Brodic, Darko et al., "Rotation of the Anisotropic Gaussian Kernel for the Improvment of the Text Skew Identification", UNITECH '10, International Scientific Conference, Nov. 19-20, 2010, pp. I-461-I-466, XP002712724, Gabrovo Retrieved from the Internet: URL:www.singipedia.com/attachment.php?attachmentid=1837&d=1295531636, [retrieved on Sep. 12, 2013].
Fisher, R. et al., "Unsharp Filter", 2003, XP002712725, Retrieved from the Internet: URL:http://homepages.inf.ed.ac.uk/rbf/HIPR2/unsharp.htm, [retrieved on Sep. 12, 2013] the whole document, pp. 1-8.
Gomes, Abel J.P., "Visual Computing and Multimedia, LAB.3, Edge Detectors", Departamento de Informatica Universidade da Beira Interior, Portugal, 2011, XP002712726, Retrieved from the Internet: URL:http://www.di.ubi.pt/~agomes/cvm/praticas/03-lab-edgedetectors.pdf, [retrieved on Sep. 12, 2013] section 3.3, 11 pages.
Extended European Search Report of European Patent Application No. 13163823.1 dated Sep. 23, 2013.

*Primary Examiner* — Nelson D. Hernández Hernández
(74) *Attorney, Agent, or Firm* — Fujitsu Patent Center

(57) ABSTRACT

An image processing apparatus includes an acquisition unit configured to acquire a first finite spatial filter having image resolution anisotropy, and a calculation unit configured to compute a second spatial filter by convolving a finite filter with respect to the first spatial filter, the finite filter having a sum of elements being 0 and at least two of the elements being non-0.

8 Claims, 45 Drawing Sheets

| POSITION | SPATIAL FILTER |
|---|---|
| $(x_1, y_1)$ | FIL1 |
| $(x_2, y_2)$ | FIL2 |
| ⋮ | ⋮ |

IMAGE PROCESSING APPARATUS AND INFORMATION PROCESSING METHOD FOR IMPROVING RESOLUTION OF DIRECTION EXHIBITING DEGRADED RESOLUTION

CROSS-REFERENCE TO RELATED APPLICATIONS

This patent application is based upon and claims the benefit of priority of the prior Japanese Patent Application No. 2012-141394 filed on Jun. 22, 2012, the entire contents of which are incorporated herein by reference.

FIELD

The disclosures herein generally relate to an image processing apparatus and an information processing method.

BACKGROUND

In images taken by a digital camera or the like, deteriorated resolutions may frequently be observed in peripheral parts of such images. The resolution in the peripheral parts of the image taken by the digital camera or the like may be likely to be deteriorated since the field angle relies on the aberrations or the aperture sizes of a lens optical system. One of the factors of such deteriorated resolution may be mechanical vignetting. Mechanical vignetting may be observed in a part of the aperture having a large field angle in a radial direction. This part of the aperture forms an elliptic shape, thereby inducing image blurring. Thus, the resolution in the radial direction may deteriorate.

In order to overcome such deterioration of the resolution, Japanese Laid-open Patent Publication No. 2012-23498 (hereinafter referred to as "Patent Document 1"), for example, discloses an image correction technology to correct an image to adjust a change in PSF (point spread function) due to an angle of incident light by filtering the image to be processed with respect to different positions utilizing different filter data.

RELATED-ART DOCUMENT

Patent Document

Patent Document 1: Japanese Laid-open Patent Publication No. 2012-23498

Note that resolution has a property that differs according to different directions. Such a property of the resolution is hereinafter called "resolution anisotropy". For example, the resolution in a radial direction may differ from the resolution in a circumferential direction.

Hence, although the image blurring is corrected by performing different filtering according to the positions of the image as disclosed in the related art technology, the related art technology may not be able to improve the resolution anisotropy.

On the other hand, in order to implement a filtering function in hardware of the digital camera or the like, the filtering function is convolved with a finite spatial filter so as to correct the image blurring. This is because a large number of operations may be required for an operation in a frequency domain, such as Fourier transform. However, when the spatial filter having anisotropy is limited to a finite number of elements, deterioration in high frequency components may be acquired in different directions to thereby induce a directional moiré pattern.

SUMMARY

According to one aspect of the present invention, an image processing apparatus may include an acquisition unit configured to acquire a first finite spatial filter having image resolution anisotropy; and a calculation unit configured to compute a second spatial filter by convolving a finite filter with respect to the first spatial filter, the finite filter having a sum of elements being 0 and at least two of the elements being non-0.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

DESCRIPTION OF EMBODIMENTS

Figure 1:
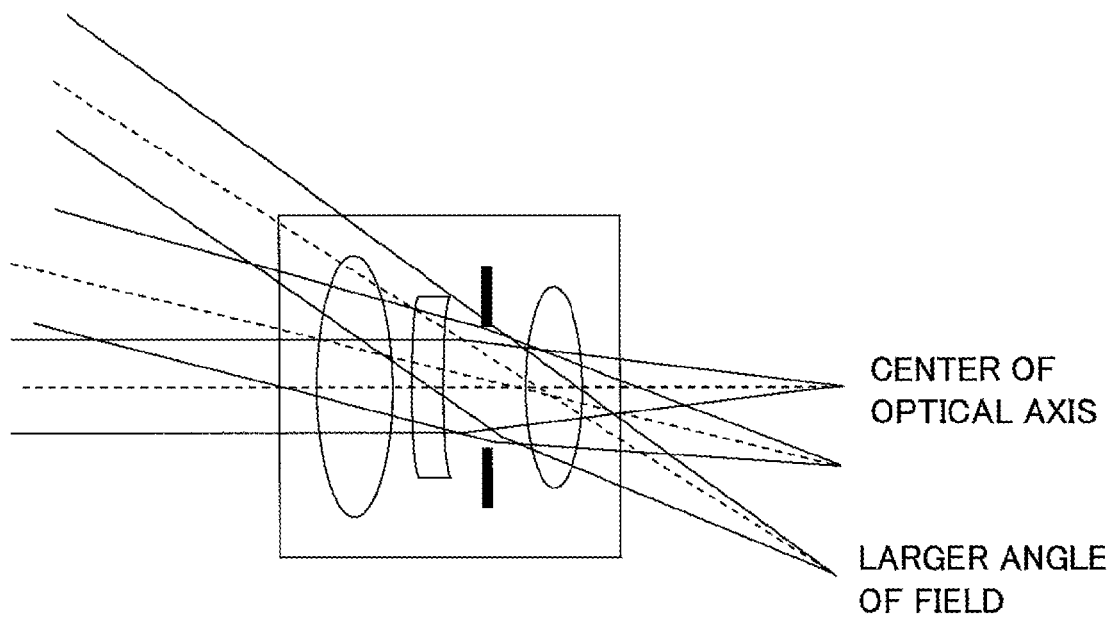
FIG. 1 is a diagram illustrating an example of an optical system.
Figure 2:
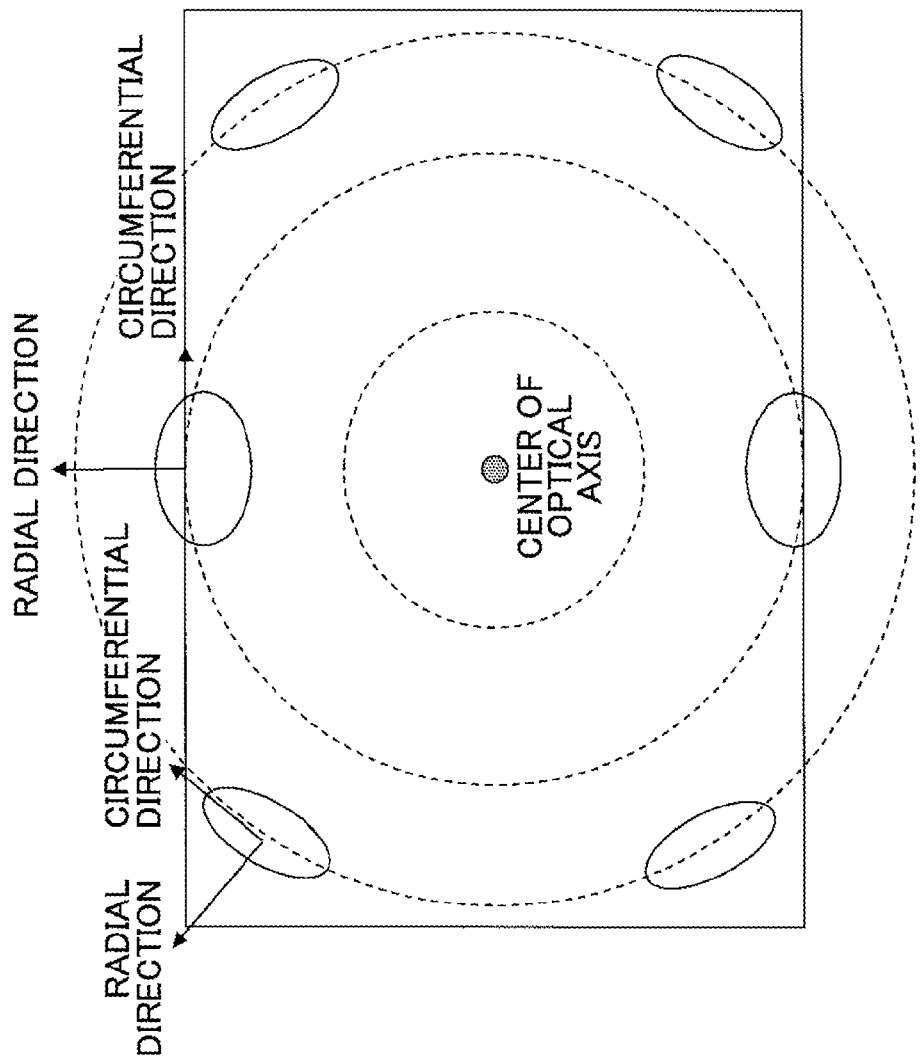
FIG. 2 is a diagram illustrating an example of an aperture according to different positions of an image.

Initially, one of the factors that may deteriorate resolution is described with reference to FIGS. 1 through 3. FIG. 1 is a diagram illustrating one example of an optical system. FIG. 2 is a diagram illustrating an example of an aperture according to different positions of an image. When the optical system illustrated in FIG. 1 is employed, the aperture in the center of an optical axis is circular. However, the aperture with a large field angle may induce mechanical vignetting as illustrated in FIG. 2. The aperture may be elliptic according to positions of the image, as illustrated in FIG. 2.

Figure 3:
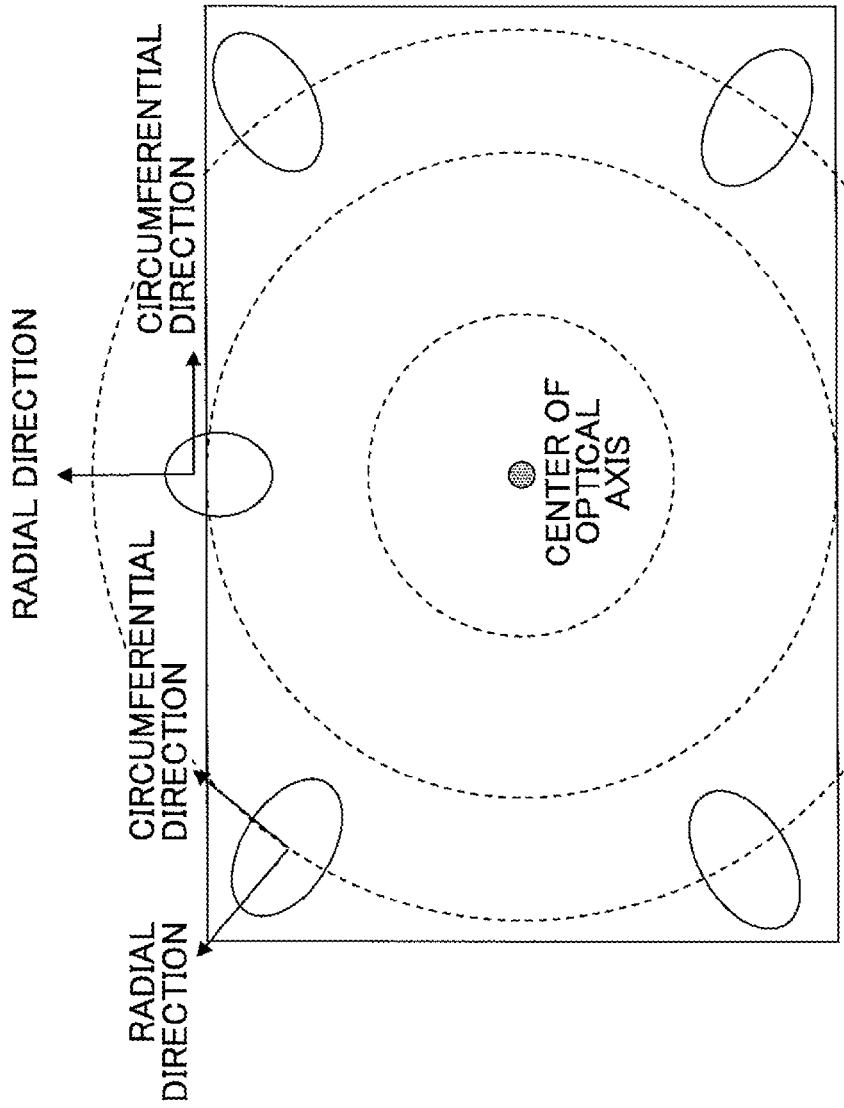
FIG. 3 is a diagram illustrating image blurring directions according to the different positions of the image.

FIG. 3 is a diagram illustrating image blurring directions according to the different positions of the image. When the optical system illustrated in FIG. 1 is employed, and the aperture is narrowed down, the resolution may deteriorate. As a result, the image blurring may be likely to be increased in a radial direction as illustrated in FIG. 3.

Next, a resolution analysis conducted by inventors of the present application is described. The deterioration of the resolution is analyzed in detail by imaging a Siemens star (hereinafter also called a "chart"), which consists of a pattern of lines radiating from a common center and being distributed (spread) toward the edges of the lines.

Figure 4:
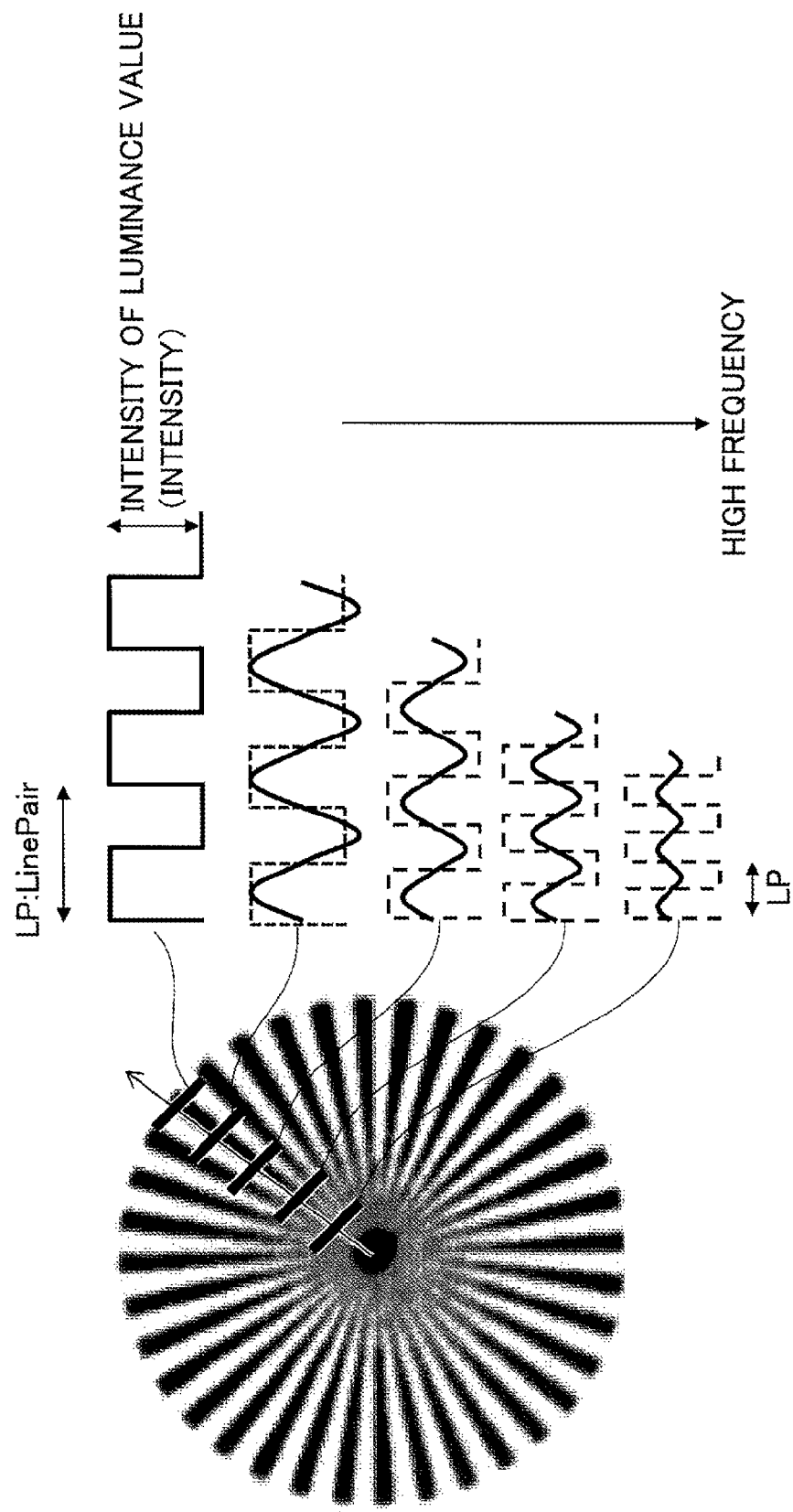
FIG. 4 is a diagram illustrating resolution when a wedge chart is employed.

FIG. 4 is a diagram illustrating resolution when employing a wedge chart. In an example illustrated in FIG. 4, in order to measure the resolution in a direction indicated by an arrow, plural data may need to be acquired in a direction perpendicular to the direction indicated by the arrow. In a wedge-shaped Simens star illustrated in FIG. 4, the lines become narrower the closer to the common center of their edges. Therefore, the number of lines per pixel unit may increase as the lines get closer to the common center. The center of the wedge-shaped Simens star represents a high frequency component. Further, the intensity of the luminance value may decrease as the lines get closer to the common center of their edges.

As illustrated in FIG. 4, directional resolution or a MTF (modulation transfer function) may be analyzed by employing a subject such as the wedge-shaped chart radiating in all directions.

Figure 5:
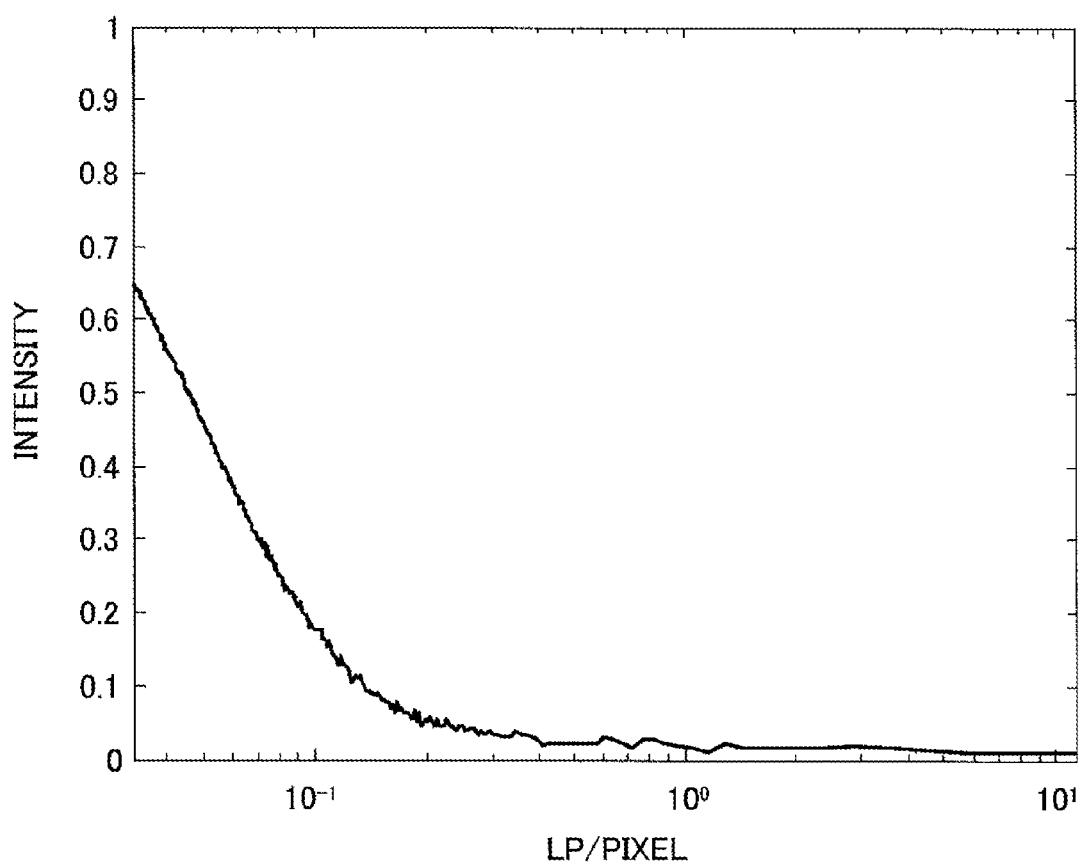
FIG. 5 is a diagram illustrating a result of the resolution measured by the wedge chart.

FIG. 5 is a diagram illustrating a measured result of the resolution analyzed by the wedge chart. More specifically, FIG. 5 is a graph illustrating the resolution measured in the direction illustrated in FIG. 4. In FIG. 5, a vertical axis indicates the luminance value and a horizontal axis indicates the number of lines (LP: Line Pair) per pixel. This analysis illustrates a process (MTF) of the intensity that decreases the closer to the center and that deteriorates the higher the frequency component (i.e., a rightward direction in the horizontal axis).

Figure 6:
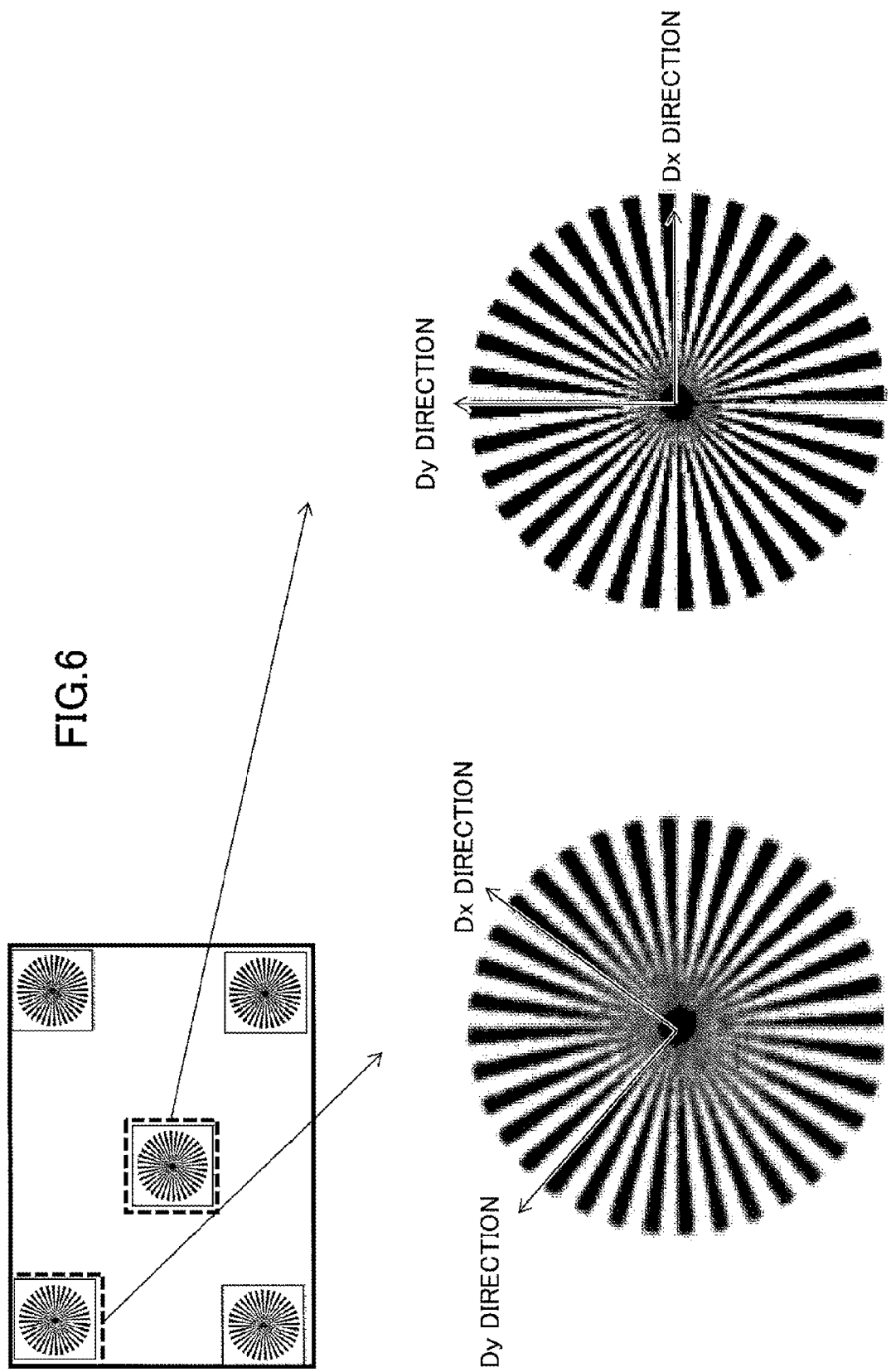
FIG. 6 is a diagram illustrating deterioration observed at different image-captured positions.

FIG. 6 is a diagram illustrating the deterioration of the intensity according to positions of an image. In an example illustrated in FIG. 6, when imaging aligned plural Simens stars, the resolution of an end part may be analyzed with respect to the center of the image-captured positions. In the example illustrated in FIG. 6, Dx indicates a circumferential direction and Dy indicates a radial direction. The above definitions of Dx and Dy are also applied to subsequent drawings.

The analysis result illustrated in FIG. 6 indicates that a peripheral part of the image including its end parts not only exhibits deterioration of the resolution but also exhibits resolution anisotropy. In comparing the resolutions of the aligned Simens stars, angle dependency may little be observed in the center of the image; however, angle dependency may be observed in the end parts of the image.

Figure 7:
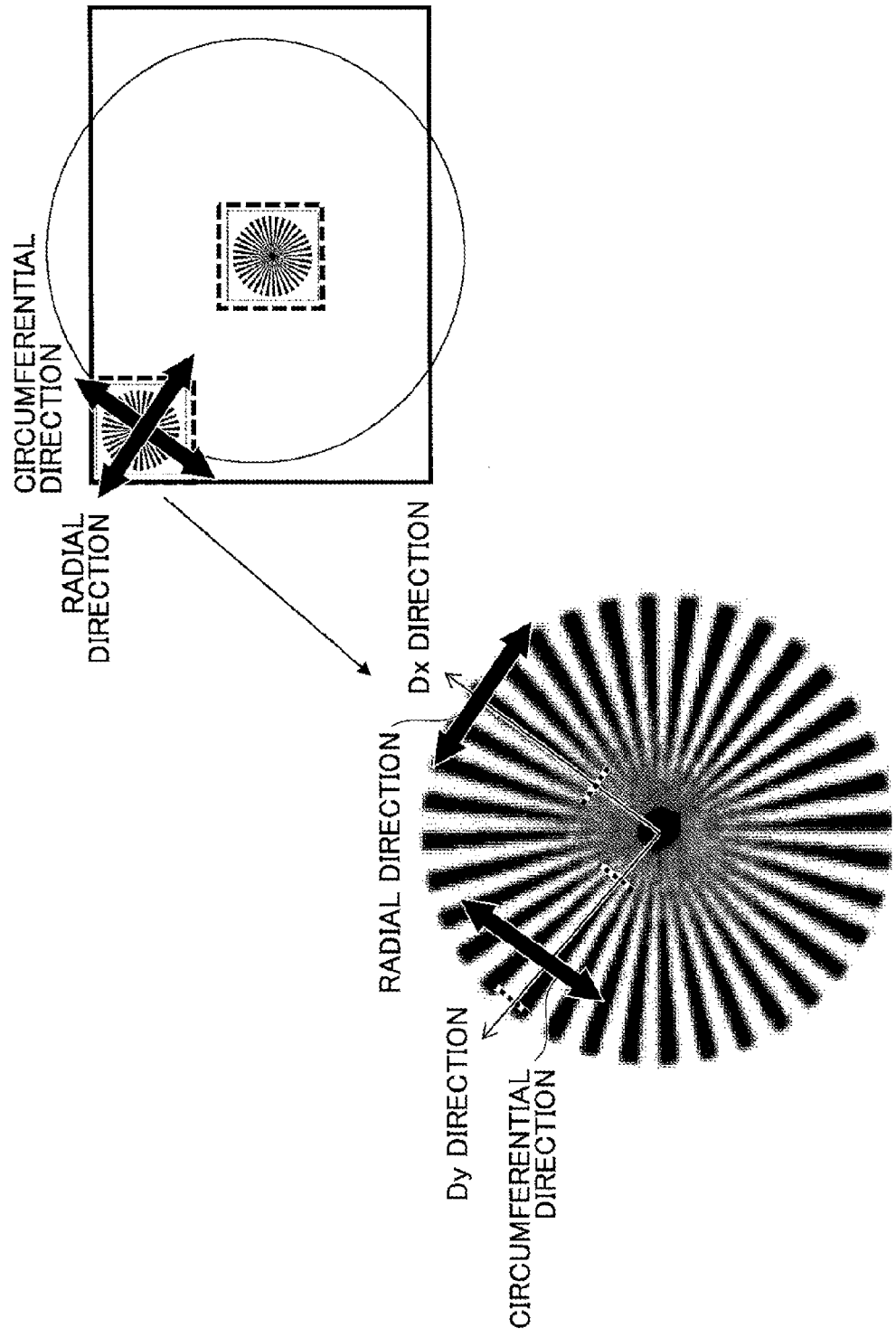
FIG. 7 is a diagram illustrating an example of the wedge chart at an end part of the captured image.

FIG. 7 is a diagram illustrating an example of the wedge chart at the end part of the captured image. The resolution of the wedge chart illustrated in FIG. 7 is analyzed in an orthogonal direction of the Dx direction (i.e., the radial direction) and in an orthogonal direction of the Dy direction (i.e., the circumferential direction).

Figure 8:
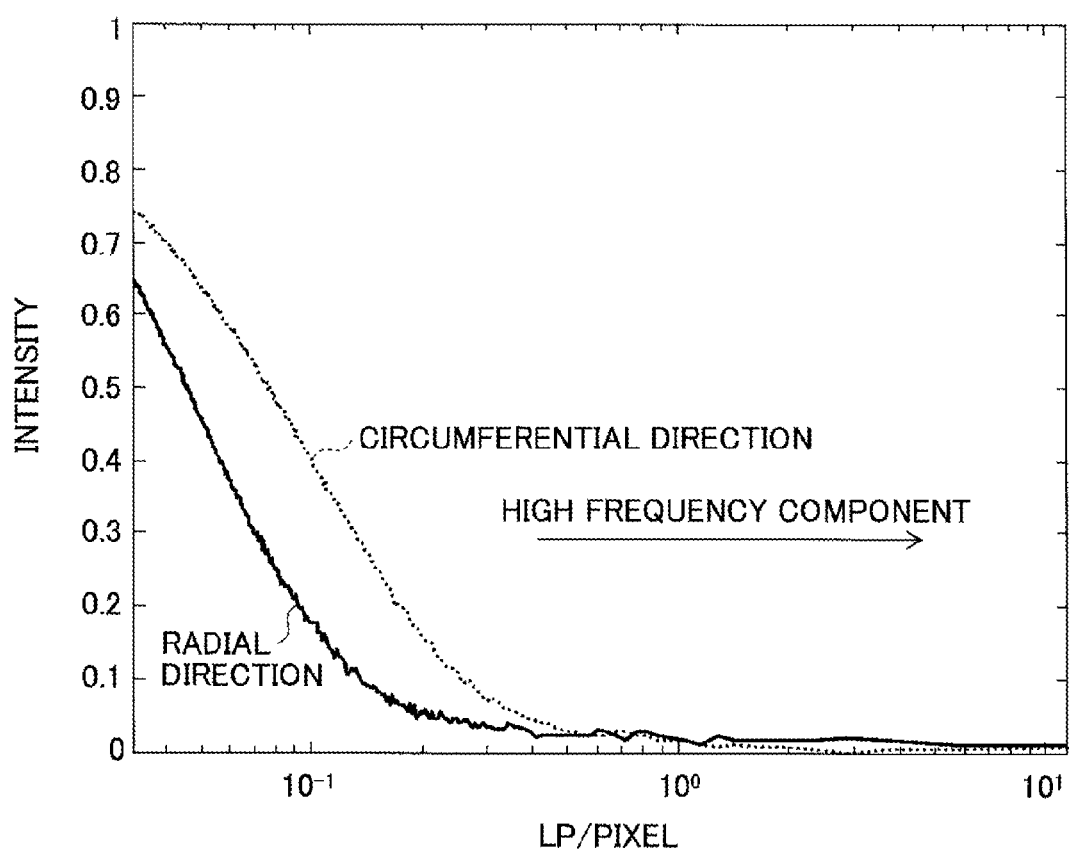
FIG. 8 is a diagram illustrating an example of a resolution analysis result of the wedge chart illustrated in FIG. 7.

FIG. 8 is a diagram illustrating an example of a resolution analysis result of the wedge chart illustrated in FIG. 7. As illustrated in FIG. 8, the resolution in the radial direction exhibits deterioration greater than the resolution in the circumferential direction. This indicates that there is resolution anisotropy in the end parts of the image, and it is possible to measure the resolution quantitatively.

Figure 9:
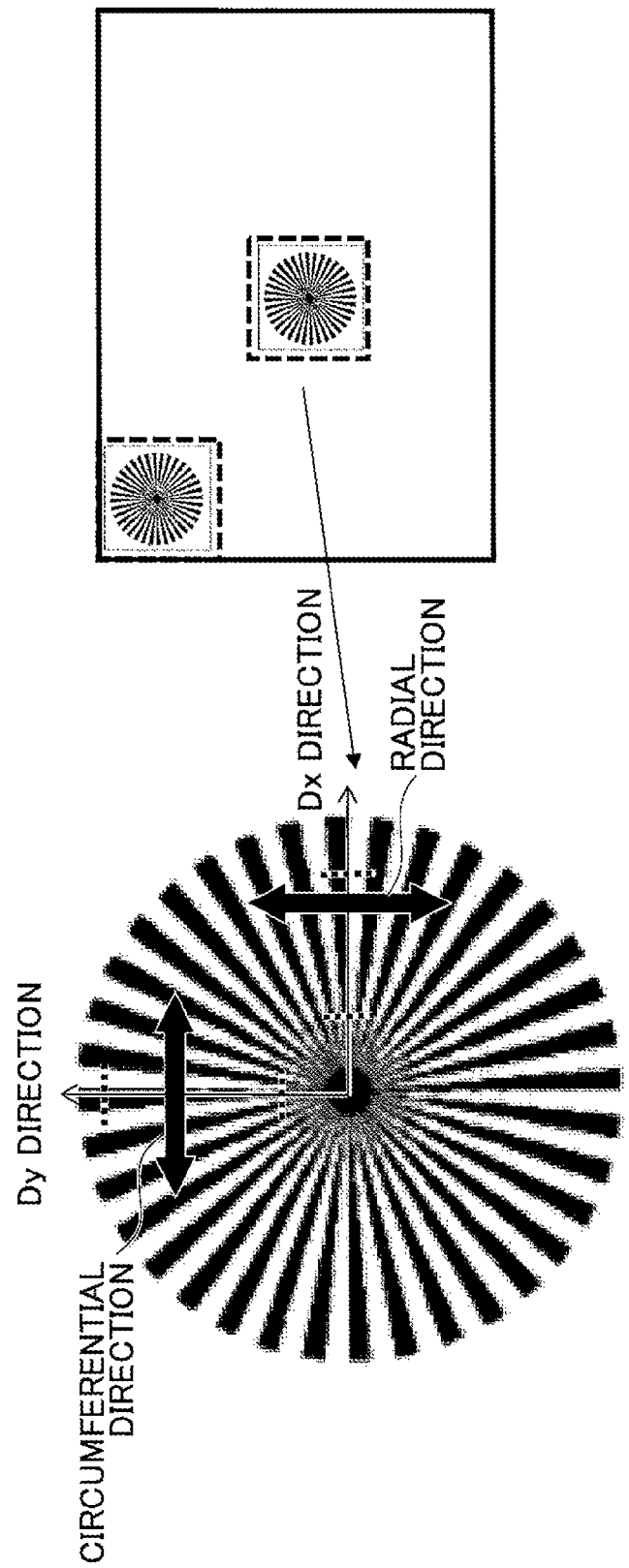
FIG. 9 is a diagram illustrating an example of a central part of the captured image of the wedge chart.

FIG. 9 is a diagram illustrating an example of the wedge chart at the central part of the captured image. The resolution of the wedge chart illustrated in FIG. 7 is analyzed in an orthogonal direction of the Dx direction (i.e., the radial direction) and in an orthogonal direction of the Dy direction (i.e., the circumferential direction).

Figure 10:
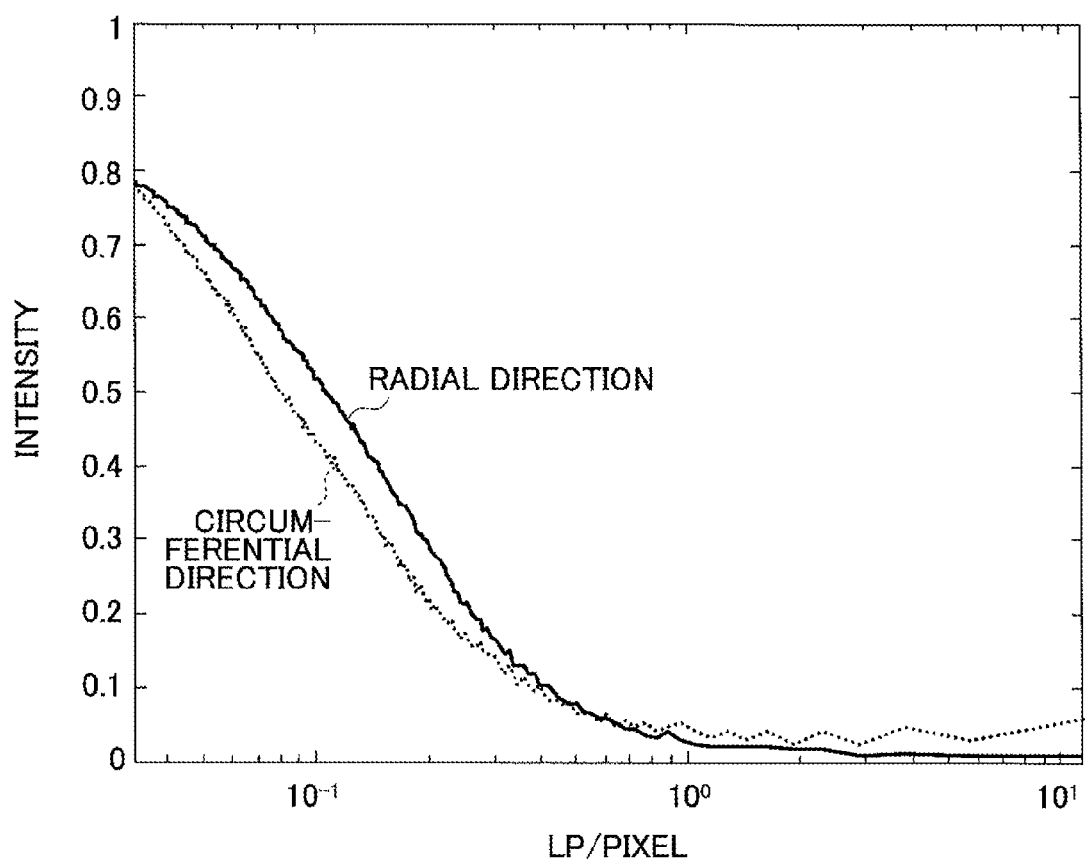
FIG. 10 is a diagram illustrating an example of a resolution analysis result of the wedge chart illustrated in FIG. 9.

FIG. 10 is a diagram illustrating an example of a resolution analysis result of the wedge chart illustrated in FIG. 9. As illustrated in FIG. 10, there is no such difference between the resolution in the radial direction and the resolution in the circumferential direction. Thus, the resolution anisotropy will not be observed in the central part of the image.

Note that in order to correct image blurring including the above-described resolution deterioration, there exists a correcting method by utilizing the point spread function (PSF). The PSF is a function representing image blurring, for example. In the following description, such a function representing image blurring is also called an "image-blurring function".

When an original image is represented by x, and the PSF is represented by k, a blurred image y is an image obtained by convolving x and k, which is represented by the following formula (1).

$$y = k \otimes x \quad (1)$$

$\otimes$ : Convolution

The actual image includes noise n; however, the noise n is omitted from the description for convenience of illustration.

The formula (2) is obtained by applying Fourier transform to the formula (1).

$$Y(\omega) = K(\omega) X(\omega) \quad (2)$$

ω: spatial frequency

Next, an inverse filter $K_{inv}$ may simply be obtained by an inverse number of K.

$$K_{inv}(\omega) = 1/K(\omega) \quad (3)$$

Thus, the Fourier transform $X(\omega)$ of the original image is computed by the following formula (4), and the inverse Fourier transform is applied to the computed result of the formula (4) so as to obtain the original image.

$$X(\omega) = K_{inv}(\omega) Y(\omega) \quad (4)$$

As described above, when the Fourier transform is applied to the PSF to compute an inverse filter function (hereinafter simply called the "inverse filter") based on the inverse number, a division is performed in the spatial frequency, which may induce a division by 0 in the high frequency domain. The division by 0 indicates a division is performed by 0 or a value close to 0. When the high frequency is close to 0, an inverse number may be too large, which may intensify the noise of the high frequency.

Figure 11:
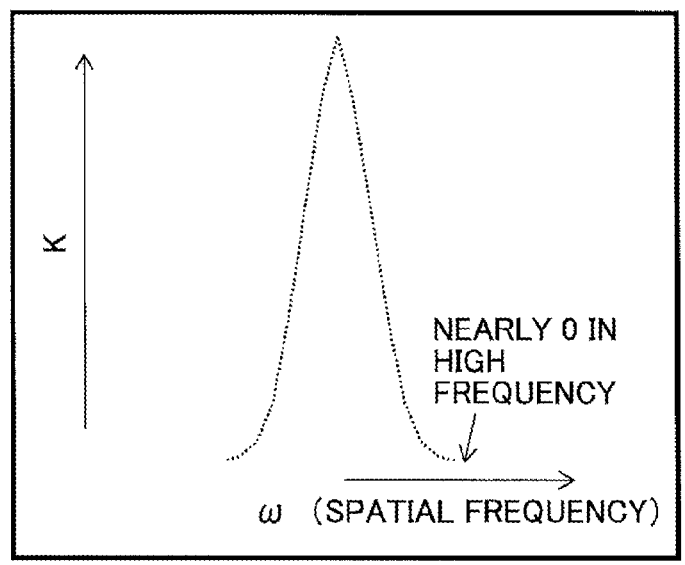
FIG. 11 is a diagram illustrating an example of characteristics when an image-blurring function undergoes Fourier transform.

FIG. 11 is a diagram illustrating an example of characteristics when the image-blurring function undergoes the Fourier transform. FIG. 11 illustrates K(ω), which approximates to 0 in the high frequency.

Figure 12:
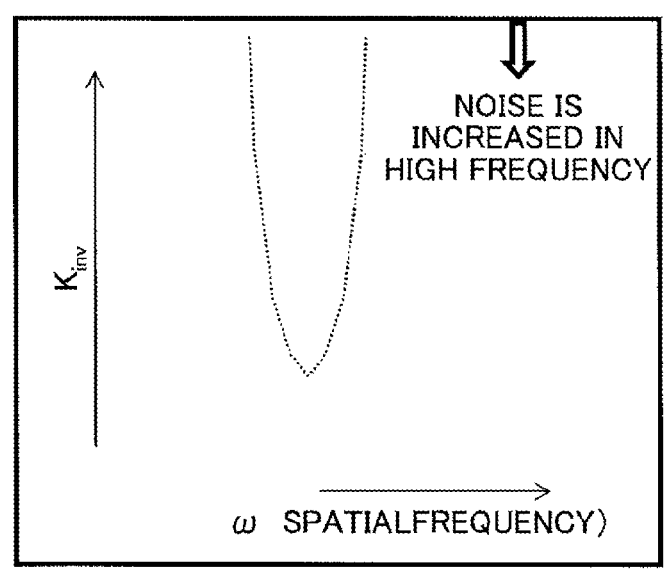
FIG. 12 is a diagram illustrating an inverse number of $K(\omega)$.

FIG. 12 is a diagram illustrating an inverse number of K(ω). FIG. 12 illustrates $K_{inv}$ represented by the above formula (3) and having a denominator of approximately 0 in the high frequency. Accordingly, noise in the high frequency may be increased.

Hence, in order to reduce such noise in the high frequency, a correction factor is introduced in the denominator of $K_{inv}$ to prevent the noise from being intensified.

$$K_{inv}(\omega) = 1/(K(\omega) + \lambda) \quad (5)$$

$$K_{inv}(\omega) = K(\omega)/(K(\omega)\overline{K(\omega)} + \lambda\overline{\lambda}) \quad (6)$$

$\overline{K(\omega)}$: Complex conjugate

Since the inverse filter is formed of a complex number, the inverse filter is represented by a complex conjugate.

Figure 13:
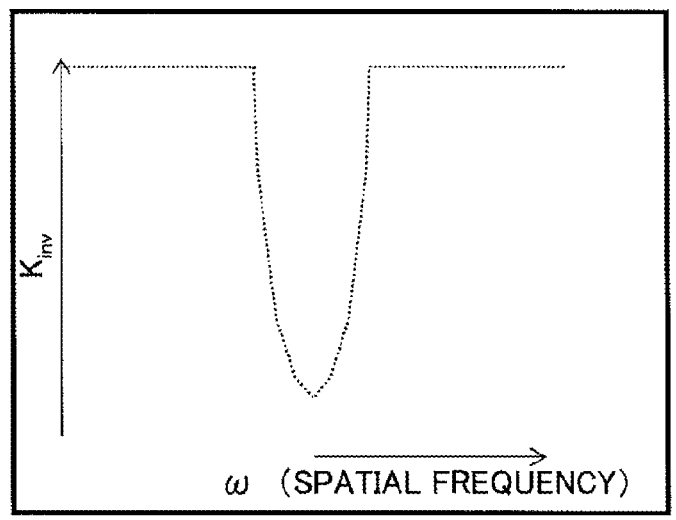
FIG. 13 is a diagram illustrating an inverse filter having a constant value added to the denominator.
Figure 14:
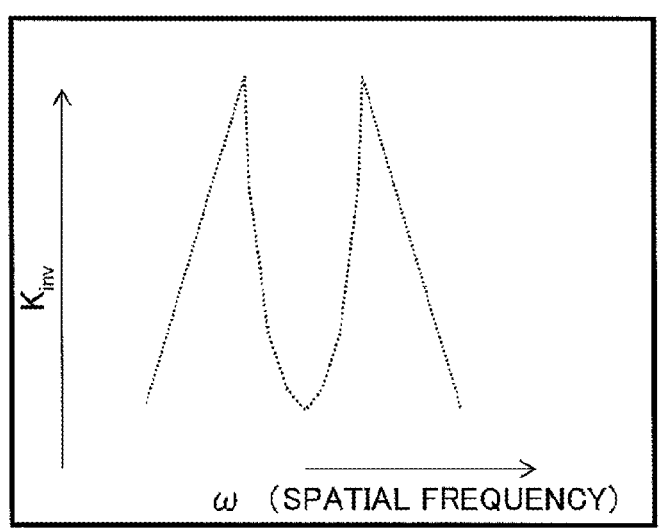
FIG. 14 is a diagram illustrating an inverse filter that drops gain with a higher frequency.

FIG. 13 is a diagram illustrating an inverse filter having a constant value added to the denominator. FIG. 14 is a diagram illustrating an inverse filter that drops gain with a higher frequency. As illustrated in FIGS. 13 and 14, the inverse filter lowers the noise by adding weights for each of the frequency components.

Figure 15:
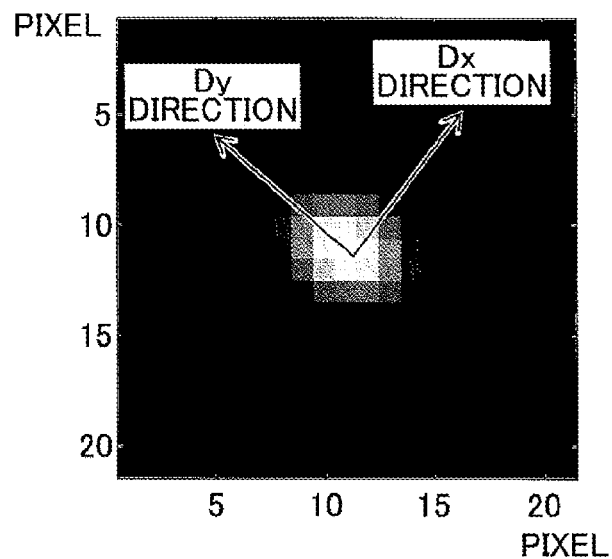
FIG. 15 is a diagram illustrating an example of an elliptic PSF (point spread function)

Note that a case in which the PSF (point spread function) is elliptic is considered below. FIG. 15 is a diagram illustrating an example of an elliptic PSF. In the example illustrated in FIG. 15, the resolution in the Dy direction is lower than the resolution in the Dx direction. That is, the resolution in the Dy direction exhibits deterioration greater than the resolution in the Dx direction.

The elliptic PSF is represented by k(r, θ). r represents a radius and θ represents a direction. The elliptic PSF may be represented as a function of the radius r and the direction θ. When the Fourier transform is applied to the elliptic PSF, the equation K(ω, θ)=fk(r, θ) is obtained. f represents the Fourier transform. K(ω, θ) obtained after the application of Fourier transform is a function of a spatial frequency ω and a direction θ.

Figure 16:
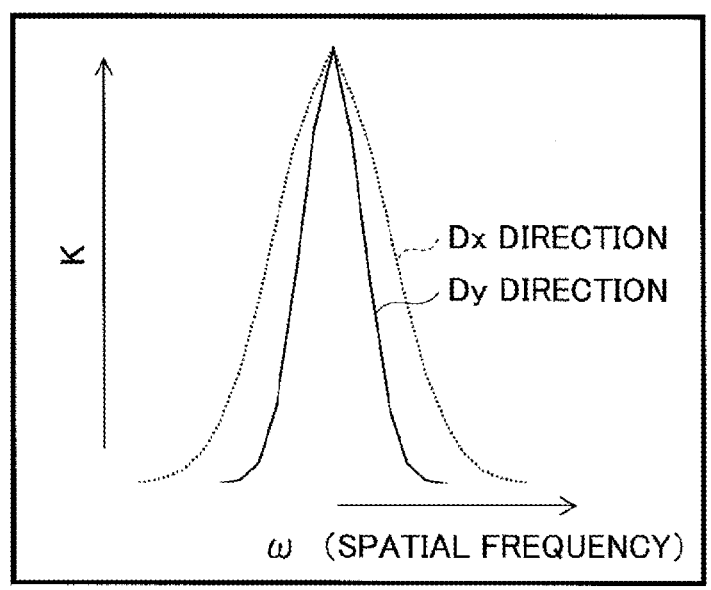
FIG. 16 is a diagram illustrating an example of characteristics when the elliptic image-blurring function undergoes Fourier transform.

FIG. 16 is a diagram illustrating an example of characteristics when the elliptic image-blurring function undergoes the Fourier transform. The example of FIG. 16 employs the image-blurring function illustrated in FIG. 15 such that the characteristics may differ according to a direction θ. As illustrated in FIG. 16, the characteristics in the Dx direction differ from the characteristics in the Dy direction having the deteriorated resolution.

Figure 17:
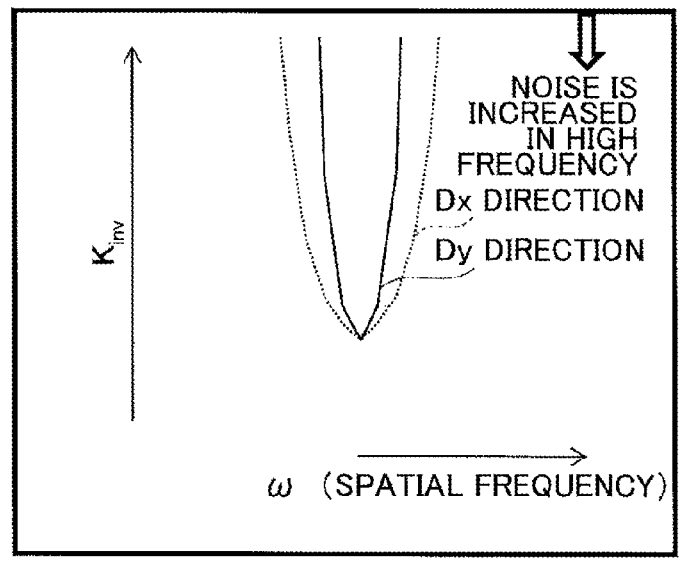
FIG. 17 is a diagram illustrating an inverse number of $K(\omega,\theta)$.

FIG. 17 is a diagram illustrating an inverse number of K(ω, θ). FIG. 17 illustrates $K_{inv}$ represented by the above formula (7) and having a denominator of approximately 0 in the high frequency. Accordingly, noise in the high frequency may be increased.

$$K_{inv}(\omega, \theta) = 1/K(\omega, \theta) \quad (7)$$

Hence, in order to reduce such noise in the high frequency, a correction factor is introduced in the denominator of $K_{inv}$ so as to prevent the noise from being intensified. The following formula (8) represents an inverse filter to reduce the noise in the high frequency.

$$K_{inv}(\omega, \theta) = K(\omega, \theta)/(K(\omega, \theta)\overline{K(\omega, \theta)} + \lambda\overline{\lambda}) \quad (8)$$

Figure 18:
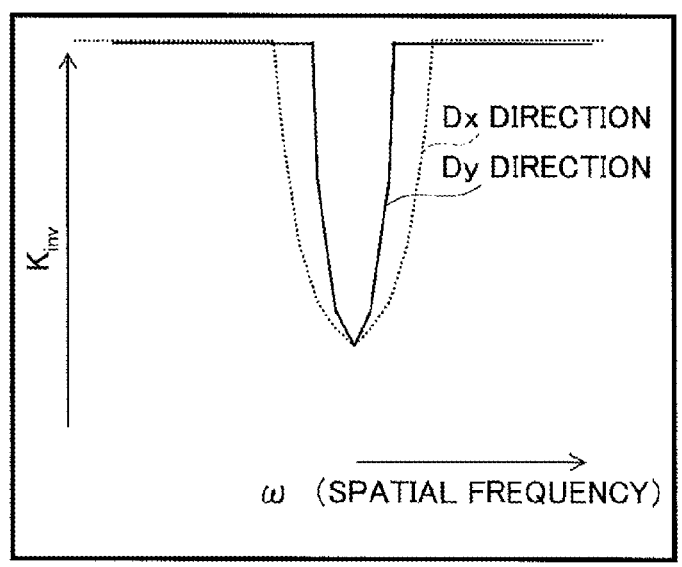
FIG. 18 is a diagram illustrating an inverse filter having a constant value added to a denominator.
Figure 19:
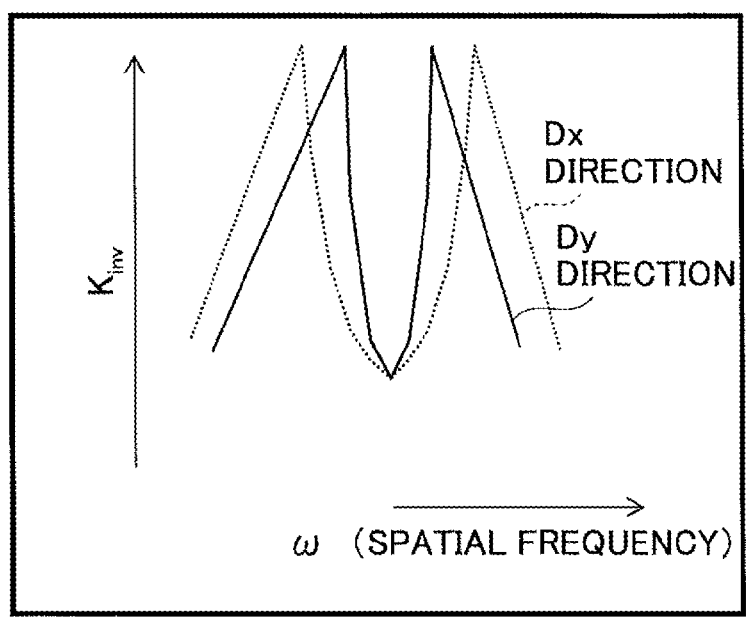
FIG. 19 is a diagram illustrating an inverse filter that drops gain with a higher frequency.

FIG. 18 is a diagram illustrating an inverse filter having a constant value added to the denominator. FIG. 19 is a diagram illustrating an inverse filter that drops gain with a higher frequency. As illustrated in FIGS. 18 and 19, the inverse filter lowers the noise by adding weights for each of the frequency components.

The elliptic image-blurring function (e.g., PSF) may also reduce the noise in the high frequency based on the corrected weights ($\lambda$). However, with this correction based on weights ($\lambda$), it may be difficult to improve the correction in a direction having the deteriorated resolution (e.g., the Dy direction). Hence, it may be difficult to improve the resolution anisotropy by simply adding the weights ($\lambda$). However, it may be possible to improve the resolution anisotropy by appropriately adjusting the weight function according to the different directions.

Figure 20:
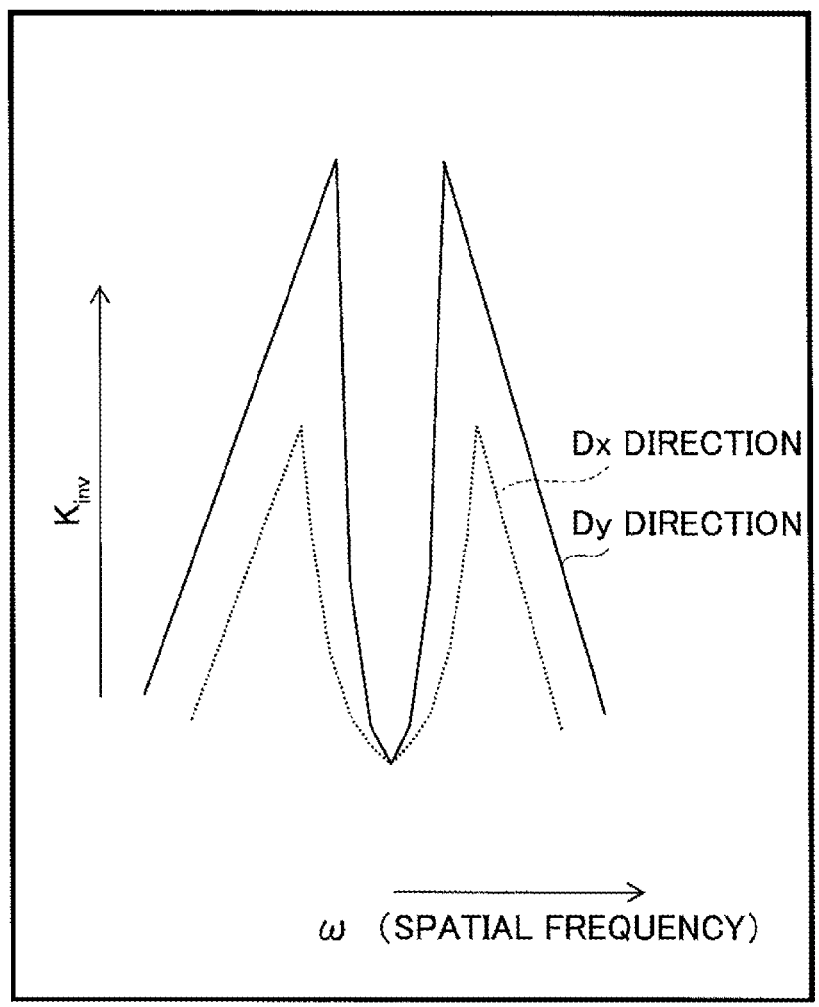
FIG. 20 is a diagram illustrating an example of an inverse filter for improving resolution anisotropy.

FIG. 20 is a diagram illustrating an example of an inverse filter for improving the resolution anisotropy. In the example illustrated in FIG. 20, the gain may be likely to be dropped with the higher frequency; however, the degraded resolution in the Dy direction may significantly be improved.

Next, the generation of a spatial filter for improving resolution anisotropy is described. As illustrated in FIG. 20, an example of a method of dropping the gain may be described with reference to a device illustrated blow. However, the method is not limited to the example illustrated in FIG. 20. For example, the method of adding the constant value as illustrated in FIG. 13 may also improve the resolution anisotropy. In this case, the constant value may be added such that the resolution in the Dy direction is intensified higher than the resolution in the Dx direction.

Spatial Filter Generator

Initially, a spatial filter generator for improving resolution anisotropy is described.

Configuration

Figure 21:
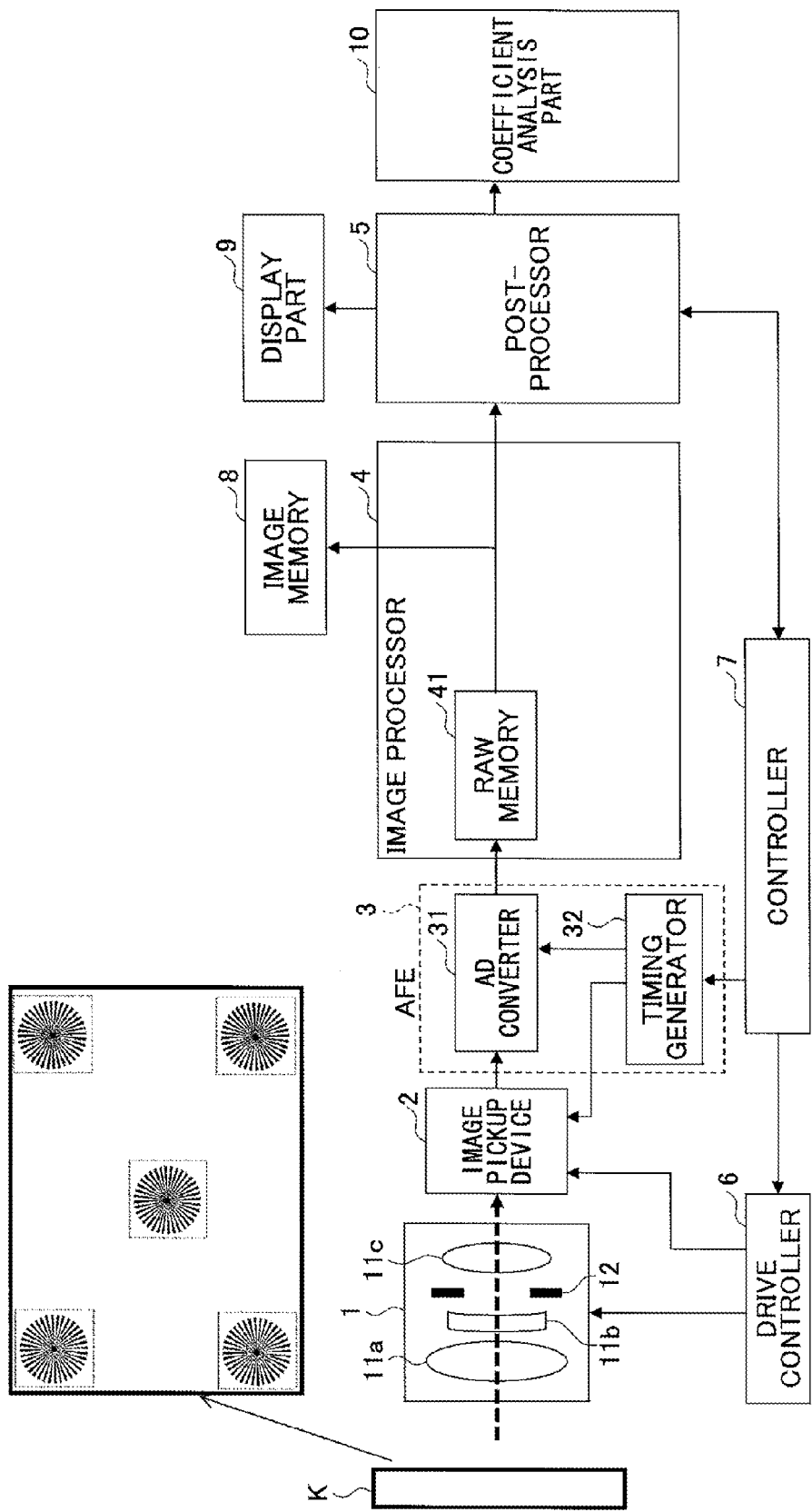
FIG. 21 is a block diagram illustrating a schematic configuration example of an image pickup apparatus including a spatial filter generator.

FIG. 21 is a block diagram illustrating a schematic configuration example of an image pickup apparatus including a spatial filter generator. The image pickup apparatus illustrated in FIG. 21 includes an optical system 1, an image pickup device 2, an AFE (analog front end) 3, an image processor 4, a post-processor 5, a drive controller 6, a controller 7, an image memory 8, a display part 9, and a coefficient analysis part 10.

The optical system 1 is configured to converge light on an image surface from a subject K having radial patterns. For example, the optical system 1 includes lenses 11a, 11b, 11c, and a diaphragm 12. The lenses 11a, 11b, 11c, and the diaphragm 12 of the optical system 1 converge light from the subject K to form an image of the subject K onto an image pickup surface of the image pickup device 2. The drive controller 6 may be able to control respective positions of the lenses 11a, 11b, and 11c, and the levels (degrees) of an aperture stop of the diaphragm 12. Note that the configuration of the optical system 1 is not limited to a specific configuration.

The image pickup device 2 is configured to convert the light converged by the optical system 1 from the subject K into electrical signals (analog signals). The image pickup device 2 may, for example, include a two-dimensional image pickup device such as a CCD or CMOS. Such a two-dimensional image pickup device is configured to convert an image of the subject into electrical signals and output the converted electrical signals to the AFE 3.

The AFE 3 is configured to convert the analog signals of the captured image into digital signals. The AFE 3 may, for example, include an AD (analog-to-digital) converter 31 and a timing generator 32. The timing generator 32 is configured to generate a timing pulse utilized for driving the image pickup device 2 based on a control signal from the controller 7 and output the generated timing pulse to the image pickup device 2 and the AD converter 31.

The image processor 4 is configured to store an image formed of the digital signals and perform a predetermined image process on the image of the digital signals. The image processor 4 may, for example, include an RAW memory 41 configured to record the converted image (i.e., RAW image) that is converted by the AD converter 31 into the digital signals. The image processor 4 may perform the predetermine process on the RAW image. The image on which the predetermined process is performed is recorded in the image memory 8.

The post-processor 5 is configured to perform a further necessary process on the image on which the predetermined process has been performed to generate a display image. The post-processor 5 may, for example, retrieve from the image memory 8 the image on which the predetermined process has been performed, and perform the necessary process on the retrieved image to generate the display image that is output to the display part 9.

The image memory 8 is configured to store the image obtained after the predetermined process has been performed on the image. The display part 9 may, for example, include a VRAM (i.e., a video RAM) configured to record an image and a display configured to output the image recorded on the VRAM. Note that the image pickup apparatus does not necessarily include a display function, and may include a recording part (e.g., the VRAM or the like) configured to record an image for display instead of the display part 9.

The drive controller 6 is configured to control the optical system 1. The controller 7 is configured to control the AFE 3, and the post-processor 5.

The coefficient analysis part 10 is configured to analyze resolution in different directions at different image-captured positions from the image of a chart, and determine appropriate filter data for improving the resolution anisotropy based on the analyzed result. The details of the coefficient analysis part 10 will be described later.

The filter data may, for example, be a group of parameters necessary for image correcting filtering such as a deconvolution kernel. The deconvolution kernel may specifically be expressed by a circular or an elliptic subject image distribution domain according to the PSF and data representing weight each of the pixels in the domain (such data are called a "deconvolution distribution").

Inverse Filter

Note that an inverse filter used in the embodiment is described. In the following, a description is given of a procedure to compute the inverse filter configured to adjust the direction exhibiting the degraded resolution to improve the resolution anisotropy. The inverse filter may simply be called a "filter".

As illustrated in the formula (1), the original image x, the PSF k, and the blurred image y are considered. In computing the original image x, an image approximating the original image x may be obtained when the following formula (9) is minimum as an inverse problem.

$$\|y - k \otimes x\|^2 \tag{9}$$

Normally, some kind of a regularization term is applied for solving the inverse problem. Thus, the inverse problem may be solved by the formula (10) having the additional regularization term.

$$\|y - k \otimes x\|^2 + \epsilon E(x) \tag{10}$$

The above problem may require directivity. Hence, differential terms of a transverse (horizontal) direction (x direction), and a longitudinal (vertical) direction (y direction) are added together with the regularization term in the problem.

$$\|y-k\otimes x\|^2 + \epsilon\{\|d_m\otimes x\|^2 + \|d_n\otimes x\|^2\} \quad (11)$$

ϵ: weighting factor
dm, dn: differential filters in matrix directions $$d_m = \begin{bmatrix} -1 & 1 \end{bmatrix}$$

$$d_n = \begin{bmatrix} -1 \\ 1 \end{bmatrix}$$

To minimize the formula (11), a result obtained by differentiating partially the formula (11) by x may simply be set to 0, and the following formula (12) is obtained when X(ω) is solved by the application of the Fourier transform.

$$X(\omega) = \frac{K(\omega)Y(\omega)}{K(\omega)^2 + \epsilon\{D_m(\omega)^2 + D_n(\omega)^2\}} \quad (12)$$

X(ω), Y(ω), K(ω), Dm(ω), and Dn(ω) represent Fourier transformed x, y, dm, and dn, respectively.

The inverse filter $K_{inv}(\omega)$ in the frequency domain satisfies the following formula (13).

$$X(\omega) = K_{inv}(\omega)Y(\omega) \quad (13)$$

Accordingly, the inverse filter $K_{inv}(\omega)$ satisfies the following formula (14).

$$K_{inv}(\omega) = \frac{K(\omega)}{K(\omega)^2 + \epsilon\{D_m(\omega)^2 + D_n(\omega)^2\}} \quad (14)$$

When the formula (14) employs the complex conjugates, the following formula (15) is obtained.

$$K_{inv}(\omega) = \frac{\overline{K(\omega)}}{K(\omega)\overline{K(\omega)} + \epsilon\{D_m(\omega)\overline{D_m(\omega)} + D_n(\omega)\overline{D_n(\omega)}\}} \quad (15)$$

$\overline{K(\omega)}$: Complex conjugate

In this embodiment, in order to adjust the direction exhibiting the degraded resolution, the axis of a differential coefficient is rotated into an angle θ direction by utilizing a rotation matrix.

$$D_x(\omega,\theta) = D_m(\omega)\cos\theta - D_n(\omega)\sin\theta \quad (16)$$

$$D_y(\omega,\theta) = D_m(\omega)\sin\theta + D_n(\omega)\cos\theta \quad (17)$$

That is, the directivity is provided by utilizing the rotation matrix.

Figure 22:
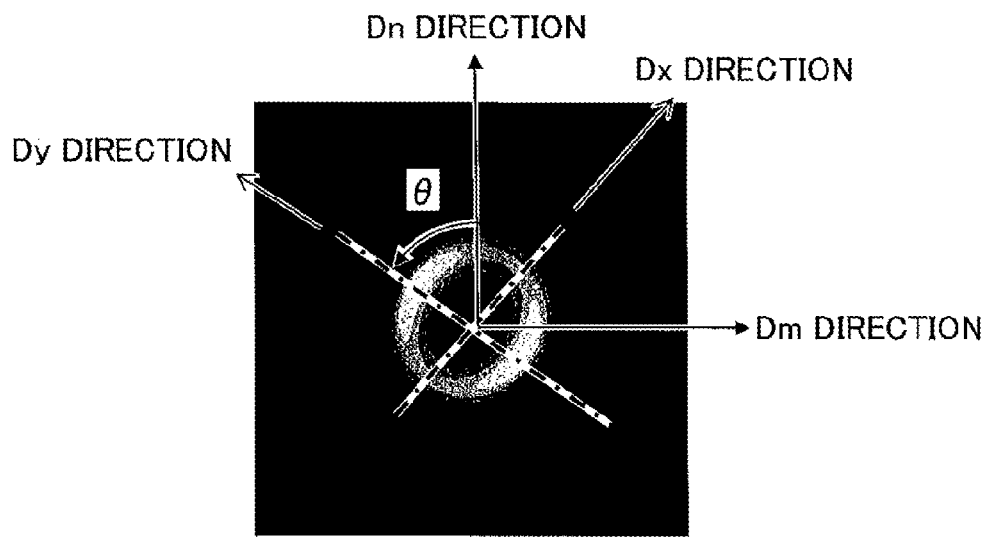
FIG. 22 is a diagram illustrating rotations.

FIG. 22 is a diagram illustrating rotations. In the example illustrated in FIG. 22, the Dn direction is rotated by θ such that the Dn direction becomes the Dy direction, and the Dm direction is rotated by θ such that the Dm direction becomes the Dx direction.

Note that the ellipse PSF is represented by k(r, θ), and the ellipse PSF obtained after the application of the Fourier transform is represented by K(ω, θ)=fk(r, θ). When the formulas (16) and (17), and K(ω, θ) are substituted into the formula (15) as well as setting the weights r according to the different directions, the following formula (18) is obtained.

$$K_{inv}(\omega,\theta) = \frac{\overline{K(\omega,\theta)}}{K(\omega,\theta)\overline{K(\omega,\theta)} + \epsilon\{D_X(\omega,\theta)\overline{D_X(\omega,\theta)} + \gamma D_Y(\omega,\theta)\overline{D_Y(\omega,\theta)}\}} \quad (18)$$

γ: weighting factor according to directions of the inverse filter
ϵ: entire weighting factor The above formula (18) may be able to implement the directional weighting adjustment of the inverse filter utilized in each of the embodiments. For example, the coefficient analysis part 10 adjusts the weight γ of the direction (Dy direction) exhibiting the degraded resolution. Hence, it may be possible to improve the direction exhibiting the degraded resolution by reducing the weighting factor γ.

Figure 23:
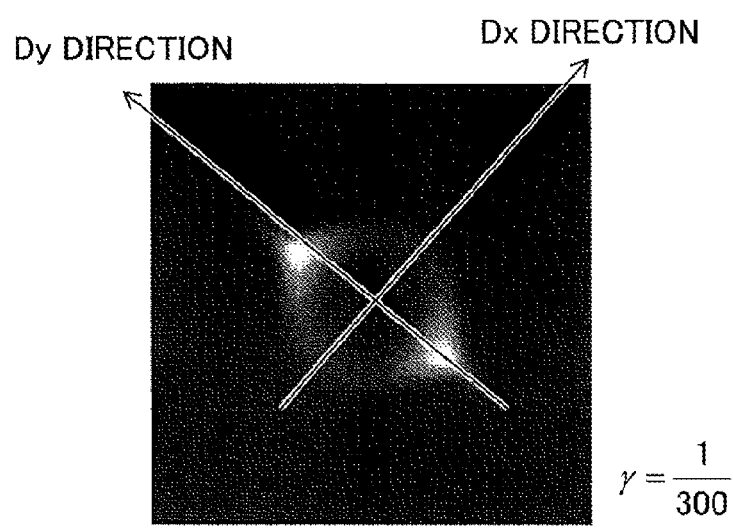
FIG. 23 is a diagram illustrating an example of a two-dimensional spatial frequency distribution of an inverse filter $K_{inv}$.

FIG. 23 is a diagram illustrating an example of a two-dimensional spatial frequency distribution of an inverse filter $K_{inv}$. The example illustrated in FIG. 23 indicates a case where γ=1/300. The weighting factors γ and ϵ (especially γ) are determined such that the degraded resolution in the Dy direction is improved greater than the degraded resolution in the Dx direction.

Figure 24:
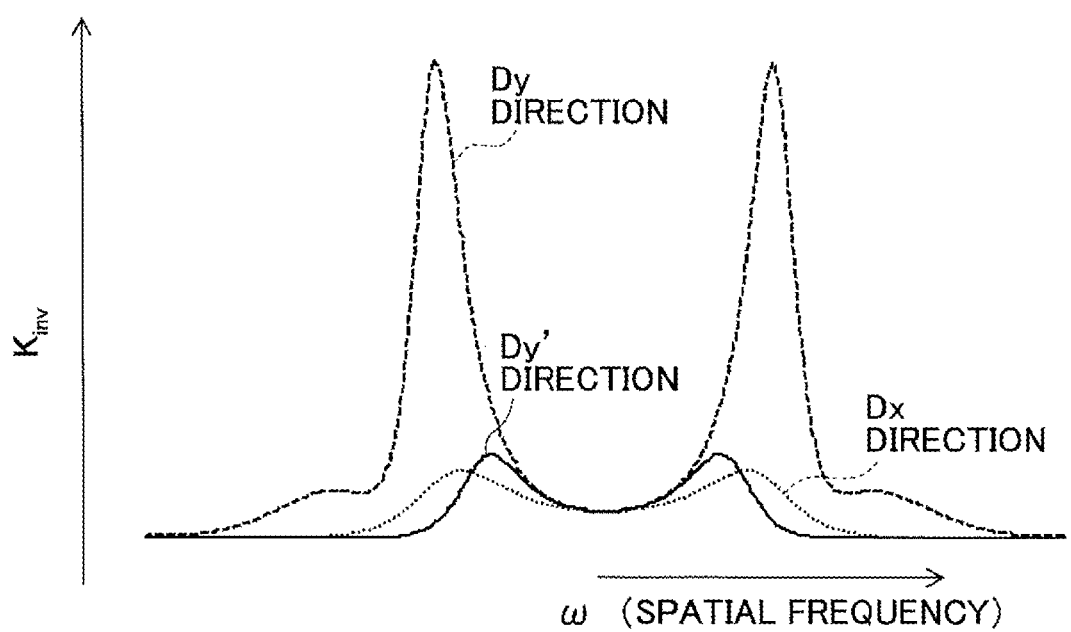
FIG. 24 is a diagram illustrating an example including distributions according to spatial frequency directions of the inverse filter $K_{inv}$.

FIG. 24 is a diagram illustrating an example of a spatial frequency directional distribution of the inverse filter $K_{inv}$. As may be clear from FIG. 24, the degraded resolution in the Dy direction may exhibit the improvement significantly higher than that in the Dx direction by reducing the weighting factor of the Dy direction. Further, Dy' in FIG. 24 indicates a distribution in a case where γ=1. Hence, anisotropy may also be given to the weighting factors by which the filter parameters of the inverse filter are multiplied according to the embodiment.

Coefficient Analysis Part

Next, the coefficient analysis part 10 is illustrated. The coefficient analysis part 10 is configured to determine a spatial filter for improving resolution anisotropy.

Figure 25:
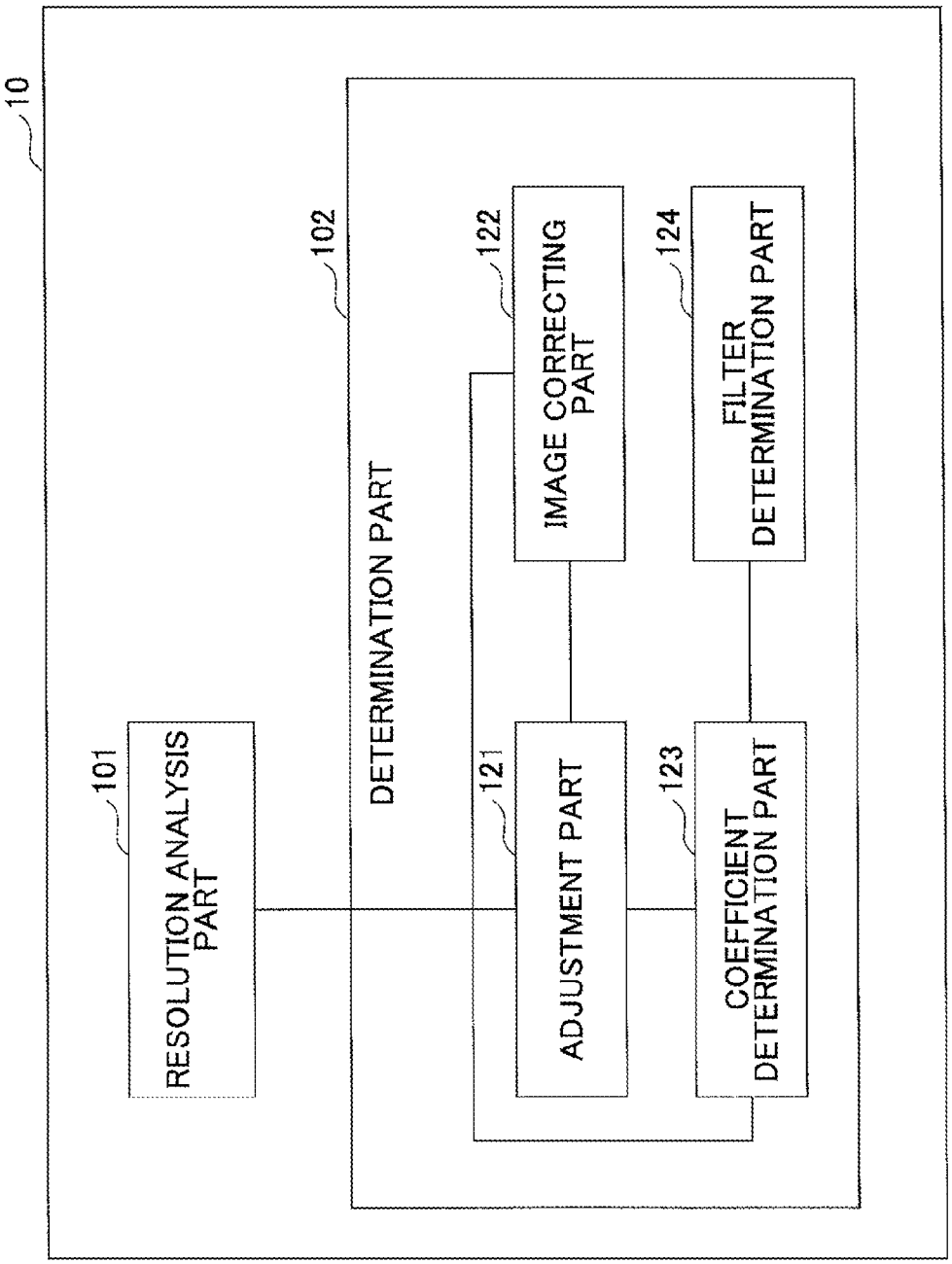
FIG. 25 is a block diagram illustrating a functional example of a coefficient analysis part.

FIG. 25 is a block diagram illustrating a functional example of the coefficient analysis part 10. The coefficient analysis part 10 illustrated in FIG. 25 includes a resolution analysis part 101, and a determination part 102. The coefficient analysis part 10 is configured to perform the coefficient analysis based on the image including the chart image. In the following example, the coefficient analysis is performed on a wedge-form image captured in the upper left position.

The resolution analysis part 101 is configured to analyze deteriorated or degraded resolution of the image including a subject having radial pattern at least in two directions. The technique of the analysis may employ a method described in FIG. 4 or FIG. 5.

The resolution analysis part 101 detects the number of lines per pixel in the horizontal axis and the intensity of amplitude in the vertical axis to compute a MTF (modulation transfer function). The number of lines per pixel may be the number of lines per unit length at a distance from an actual position of the subject. Since this embodiment employs the wedge-shaped radial chart, the directional MTF illustrated in FIG. 5 may be analyzed.

Figure 26:
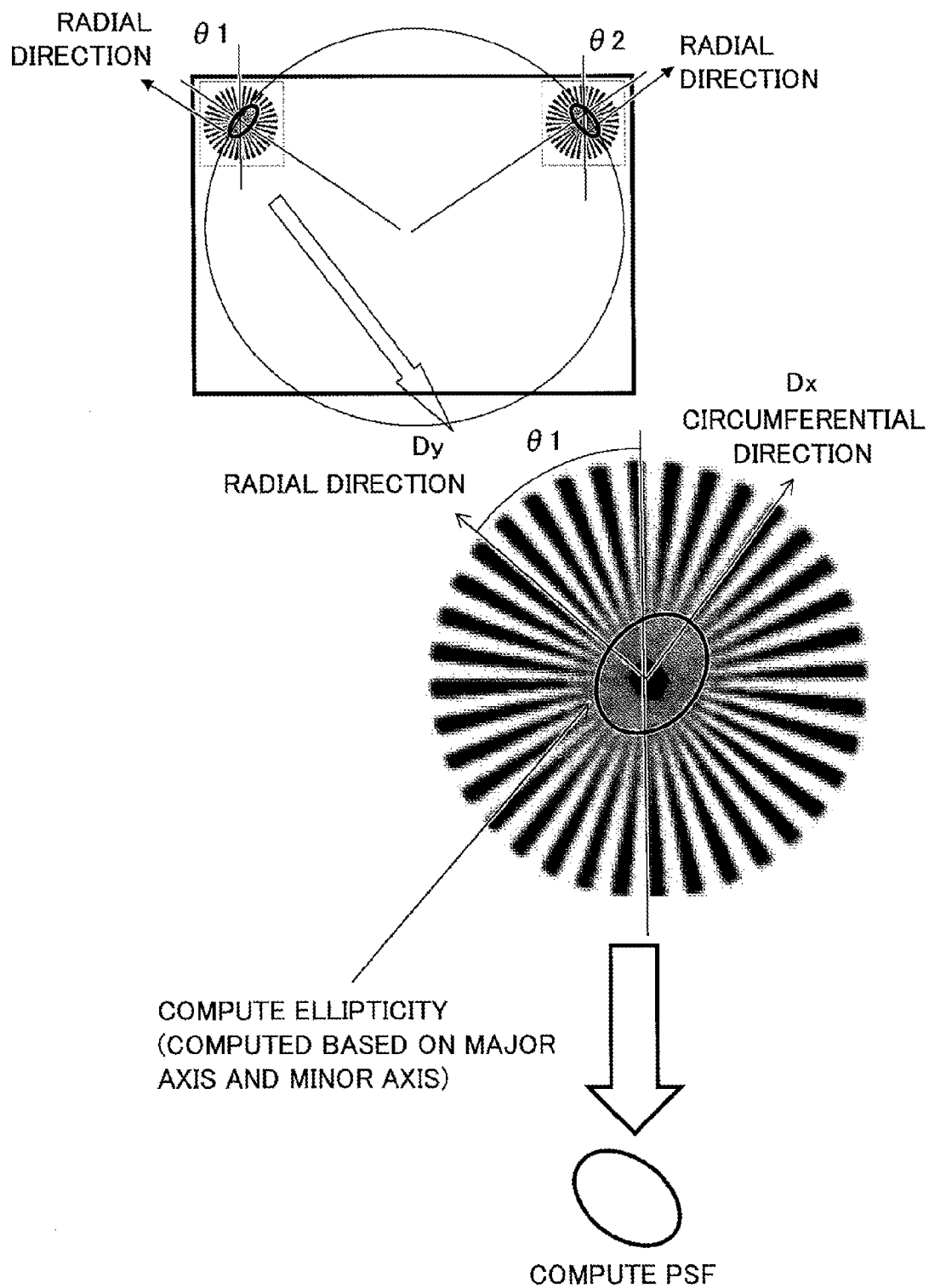
FIG. 26 is a diagram illustrating a computational procedure of the PSF.

FIG. 26 is a diagram illustrating a computational procedure of PSF (point spread function). In an example illustrated in FIG. 26, the determination part 102 initially computes angles and ellipticity according to positions of the image. The determination part 102 may be able to compute an ellipse by forming a contour line with a predetermined threshold (approximately half of the maximum amplitude) in the MTF computed per predetermined angle.

The determination part 102 may be able to compute ellipticity based on a longitudinal axis and a short axis of the computed ellipse. The determination part 102 geometrically computes an angle θ1 based on a position of the image. The determination part 102 may also be able to compute the angle θ1 based on the longitudinal axis and the short axis of the resolution ellipse. The latter method of computing the angle θ1 based on the longitudinal axis and the short axis of the resolution ellipse may be able to compute the angle in compliance with the actual image blurring. As already illustrated with reference to FIG. 3, the image blurring in the radial direction may be large when a concentric circle is drawn from the center of the optical axis.

The determination part 102 may, for example, compute an angle between the vertical direction and the radial direction. Note that the center of the optical axis is basically the center of the image; however, the center of the image may be deviated (shifted) by the shift of the lens position. The determination part 102 determines the PSF based on the computed ellipticity and angle. In this case, the ellipse of the PSF resides in a direction rotated by 90 degrees from the direction in which the ellipse formed of the contour line resides.

Referring back to FIG. 25, the determination part 102 determines, based on the resolution analysis result of the corrected image, filter data having anisotropy of the inverse filter with respect to the corrected image corrected by the filter (i.e., the above inverse filter) in compliance with the image blurring function (i.e., PSF).

Further, the determination part 102 determines the weighting factor (e.g., γ) by changing the weighting factor with respect to a differential direction of the image. For example, the determination part 102 determines the weighting factor of the Dx direction as 1, and the weighting factor of the Dx direction as γ, and then adjusts the weighting factor γ of the Dx direction. Accordingly, the resolution anisotropy may be improved.

Further, the determination part 102 determines the weighting factor by rotating the direction (e.g., θ) with respect to the differential direction of the image. Accordingly, the direction of the degraded resolution may be detected and filtering may be performed based on the detected direction of the degraded resolution.

Specifically, the determination part 102 may determine appropriate weighting factors ε and γ by, for example, adjusting the weighting factors ε and γ. The weighting factor γ represents a weighting factor of the filter parameter in the direction of the degraded resolution. The filter parameter in the direction of the degraded resolution may, for example, be a complex conjugate of the Dy (ω, θ) associated with the weighting factor γ of the formula (18) and its Dy (ω, θ).

Since the determination part 102 determines the weighting factor by adjusting the weighting factor, the determination part 102 includes an adjustment part 121, an image correcting part 122, a coefficient determination part 123, and a filter determination part 124.

The adjustment part 121 may, for example, adjust the weighting factor ε that does not depend on the directions and the weighting factor γ that depends on the directions. The adjustment part 121 sets initial values of the weighting factors ε and γ, and transmits the initial values to the image correcting part 122.

The image correcting part 122 performs the image correction based on the weighting factors acquired from the adjustment part 121. The image correcting part 122 corrects the image by filtering the image utilizing the inverse filter illustrated in the formula (18). The image correcting part 122 transfers the corrected image to the resolution analysis part 101 so as to analyze the deterioration of the resolution again.

The coefficient determination part 123 determines the weighting factors based on the resolution analysis result with respect to the corrected image such that the difference in the deterioration of the resolution between the two directions is small. The coefficient determination part 123 retains the analysis results of the corrected images corrected based on various weighting factors, and determines the weighting factors ε and γ such that the difference between the values of the spatial frequency is minimized (a determination process 1).

Further, the coefficient determination part 123 may determine the weighting factors ε and γ such that the difference between the intensities of the amplitude in a predetermined spatial frequency is minimized (a determination process 2).

Note that plural thresholds may be set for each of the thresholds 1 and 2. The coefficient determination part 123 may determine the weighting factors such that the sum of squared difference in each of the thresholds is minimized. Note that the coefficient determination part 123 may determine the weighting factors such that the predetermined difference is less than or equal to the threshold set in advance. This threshold may be set in the experiments performed in advance.

Further, the coefficient determination part 123 may determine the weighting factor such that the difference between the sum of squared difference between two directional resolutions in the central part of the image and the sum of squared difference between two directional resolutions in the peripheral part of the image differing from the central part of the image is a predetermined value or less. In addition, the coefficient determination part 123 may determine the weighting factors such that the difference between the sum of squared difference between the central part and the peripheral part of the image is minimized.

This is because when reducing the resolution anisotropy, the resolution of the entire image may be uniform by equating the resolution of the central part of the image with the resolution of the peripheral part of the image, which may improve the image quality.

The determination in minimizing the weighting factors made by the coefficient determination part 123 may be computed by utilizing a minimization function or may be judged by a person. Examples of the minimization function include a simplex search method (or simplex algorithm), a steepest-descent method, and a conjugate gradient method.

The determination part 102 is configured to adjust the weighting factor by changing the weighting factor, compute an inverse filter based on the adjusted weighting factor, correct an image by the computed inverse filter, and determine an optimal weighting factor based on the resolution analysis result of the corrected image. The determination part 102 repeatedly adjusts the weighting factor, computes the inverse filter, corrects the image by the inverse filter, and analyzing the resolution of the image until determination part 102 determines the optimal weighting factor.

The filter determination part 104 is configured to compute an inverse filter $K_{inv}$ utilizing the optimal weighting factor determined by the coefficient determination part 123, and then compute an inverse filter $k_{inv}$ in a spatial domain based on the inverse filter $K_{inv}$ in the frequency domain. Note that the inverse filter $k_{inv}$ in the spatial domain is hereinafter called a "spatial filter".

$$x = k_{inv} \otimes y \tag{19}$$

$$k_{inv} = f^{-1} \frac{\overline{K(\omega, \theta)}}{K(\omega, \theta)\overline{K(\omega, \theta)} + \varepsilon \{D_X(\omega, \theta)\overline{D_X(\omega, \theta)} + \gamma D_Y(\omega, \theta)\overline{D_Y(\omega, \theta)}\}} \tag{20}$$

Since the number of taps (elements) is extracted from the computed inverse filter $k_{inv}$, the computed inverse filter $k_{inv}$ is limited to a finite filter.

Note that the coefficient analysis part 10 performs the above processes within the image having a chart. The coefficient analysis part 10 analyzes the resolution anisotropy at respective positions within the image, and determines the spatial filter for improving such resolution anisotropy.

The spatial filter for improving the resolution anisotropy while correcting image blurring may be determined with respect to predetermined image positions by performing the aforementioned processes. For example, the coefficient analysis part 10 may detect the direction having resolution degraded greater than the resolutions in other directions so as to determine the weighting factor to improve the degraded resolution in the detected direction.

Figures 27, 28:
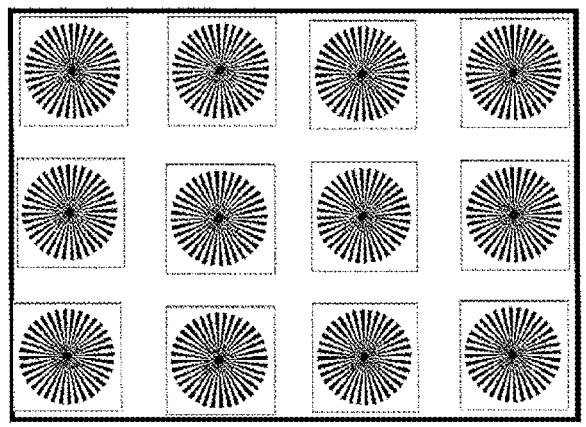
FIG. 27 is a diagram illustrating an example of an image having 12 imaged wedge charts.
FIG. 28 is a diagram illustrating an example of a spatial filter table.

The coefficient analysis part 10 performs the spatial filter computation at respective positions of the image. FIG. 27 is a diagram illustrating an example of an image having 12 wedge charts. FIG. 27 illustrates only one example of the image having 12 wedge charts, and the image may have the number of wedge charts other than 12 insofar as the charts reside in the corresponding divided regions of the image.

The coefficient analysis part 10 determines filter data in respective regions having the charts to compute the spatial filters. The coefficient analysis part 10 creates a table having the spatial filters each associated with the corresponding positions of the image.

FIG. 28 is a diagram illustrating an example of a spatial filter table. The spatial filter table illustrated in FIG. 28 associates upper left pixel coordinates in the regions having respective charts of the image, and the corresponding spatial filters computed based on the computed charts in the respective regions. For example, the position (x1, y1) is associated with a spatial filter (FIL1) as illustrated in FIG. 28.

Accordingly, the image processing apparatus having the coefficient analysis part 10 may be able to determine a spatial filter having improved resolution anisotropy. The spatial filter having the improved resolution anisotropy is not limited to the above-described example. The spatial filter having the improved resolution anisotropy may be the spatial filter computed by the technology disclosed in Patent Document 1 (i.e., Japanese Laid-open Patent Publication No. 2012-23498). In such a case, the spatial filter may need to have resolution anisotropy.

Note that the image processor 4 may, for example, be formed of a (digital signal processor). In this case, the RAW memory 41 may be a DSP embedded memory or an external memory. Further, the post-processor 5, the image memory 8, the coefficient analysis part 10, the VRAM for display and the like may integrally be formed as an integrated DSP together with the image processor 4. Alternatively, the coefficient analysis part 10 may be formed as a single unit or may be formed as the image processing apparatus including other processors.

Alternatively, the function of the image processor 4 or the coefficient analysis part 10 may be realized not by a specifically designated processor such as DSP but by causing a general-purpose processor such as a CPU (central processing unit) to execute a predetermined program. Similarly, the drive controller 6, the controller 7, and the post-processor 5 may also be formed of at least one specifically designated processor or general-purpose processor.

Note that the program causing the processor to function as the image processor 4 or the coefficient analysis part 10 and a recording medium recording such a program may also serve as embodiments of the present invention. The above recording medium has a non-transitory configuration, and is not a transitory medium such as a signal itself.

Problem of Making Finite Spatial Filter

Next, a problem that may arise when making a finite spatial filter is described. When making the finite spatial filter having anisotropy, information contained in parts other than the extracted taps (elements) may be lost (missing). Since the spatial filter has anisotropy, missing information may differ in different directions. In addition, a total number of added elements may differ in the different directions.

Since the missing information contains high frequency information, levels of the correction (correcting degrees) may differ in different correcting directions when correcting the image utilizing the finite spatial filter.

Figure 29:
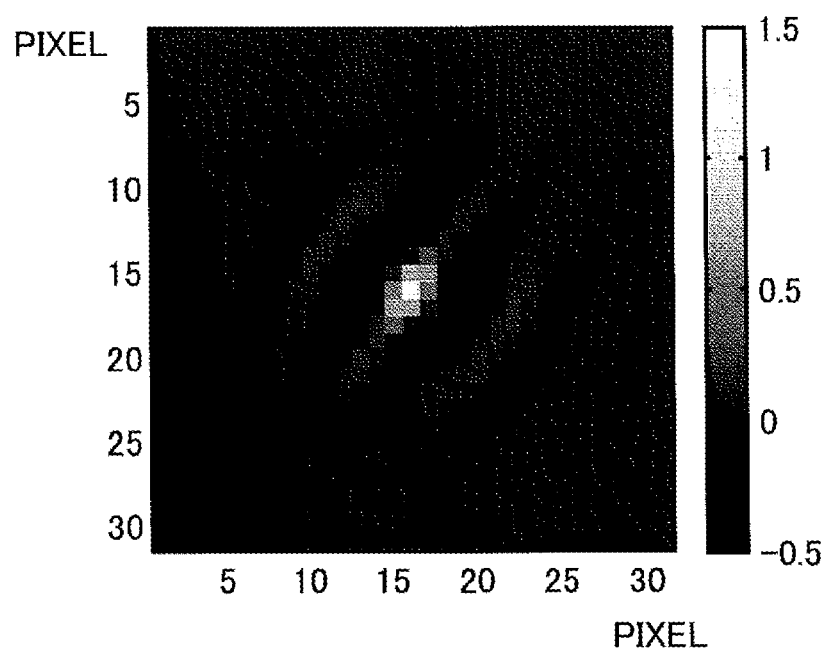
FIG. 29 is a diagram illustrating an example of a spatial filter.

FIG. 29 is a diagram illustrating an example of a spatial filter. The spatial filter illustrated in FIG. 29 includes anisotropy based on the above-described formula (20). In FIG. 29, the elements of the spatial filter are expressed by different colors.

Figure 30:
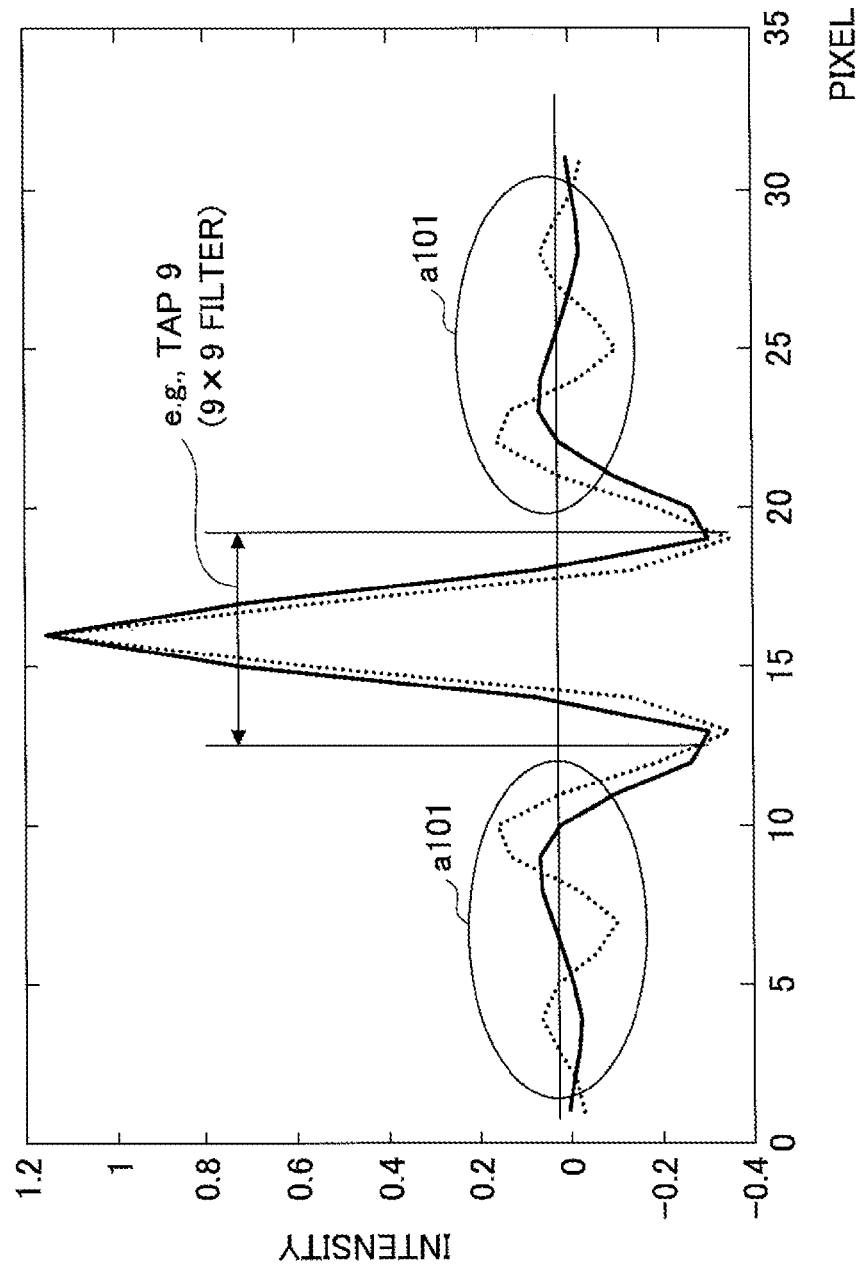
FIG. 30 is a diagram illustrating intensity of a finite spatial filter.

FIG. 30 is a diagram illustrating the intensity of the finite spatial filter. In the example illustrated in FIG. 30, when the number of taps is nine, the number of elements corresponding to nine taps (i.e., 9×9) is extracted from the center of the spatial filter. As illustrated in FIG. 30, the vertical axis represents the intensity of the finite spatial filter. When a finite number of elements is extracted from the spatial filter, information is lost in parts indicated by a101. Further, since the spatial filter exhibits anisotropy, high frequency information to be lost may differ in different directions.

Figure 31:
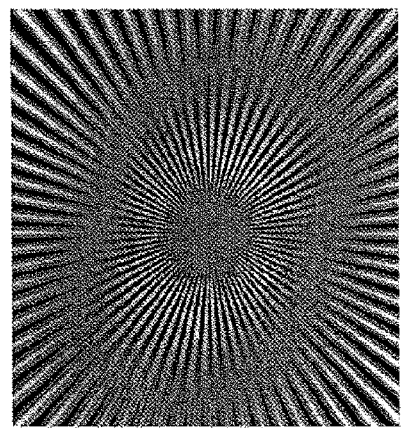
FIG. 31 is a diagram illustrating an example of a moiré pattern generated in a corrected image.

Thus, levels of the correction (correcting degrees) may differ in the different directions when using the finite spatial filter. As illustrated in FIG. 31, when the chart is corrected by the spatial filter having nine taps, a moiré pattern is generated. FIG. 31 is a diagram illustrating an example of a moiré pattern generated in a corrected image. As illustrated in FIG. 31, a moiré pattern is generated by making the spatial filter finite.

Figure 32:
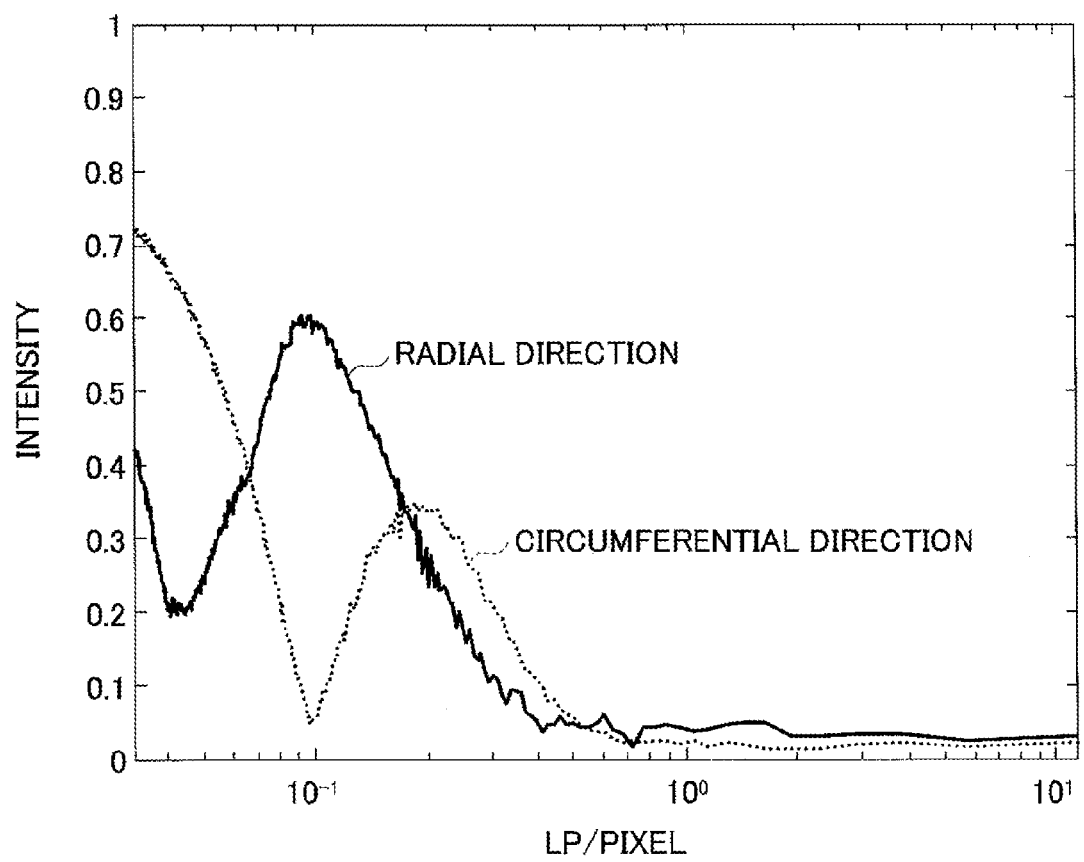
FIG. 32 is a diagram illustrating a resolution analysis result of the image corrected by the finite spatial filter.

FIG. 32 is a diagram illustrating a resolution analysis result of the image corrected by the finite spatial filter. As illustrated in FIG. 32, correcting degrees of deterioration in the resolution differ in different directions.

Figure 33:
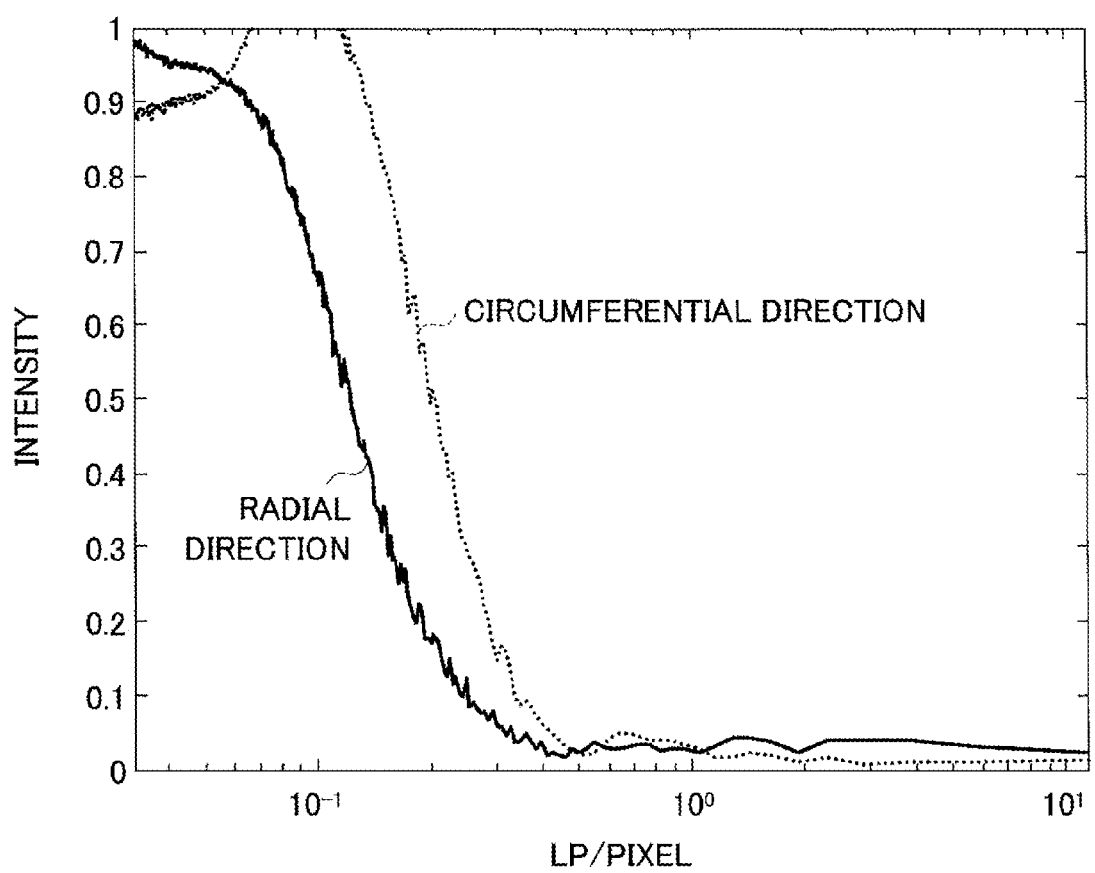
FIG. 33 is a diagram illustrating a resolution analysis result of the image corrected by suppressing the moiré pattern.

FIG. 33 is a diagram illustrating a resolution analysis result of the image corrected by suppressing the moiré pattern. In the example illustrated in FIG. 33, anisotropy remains in the resolution as a result of suppressing the improvement of the high frequency for preventing the moiré pattern from being generated.

In the following, illustrations are given of embodiments of preventing the generation of the moiré pattern when making the spatial filter finite.

First Embodiment

Figure 34:
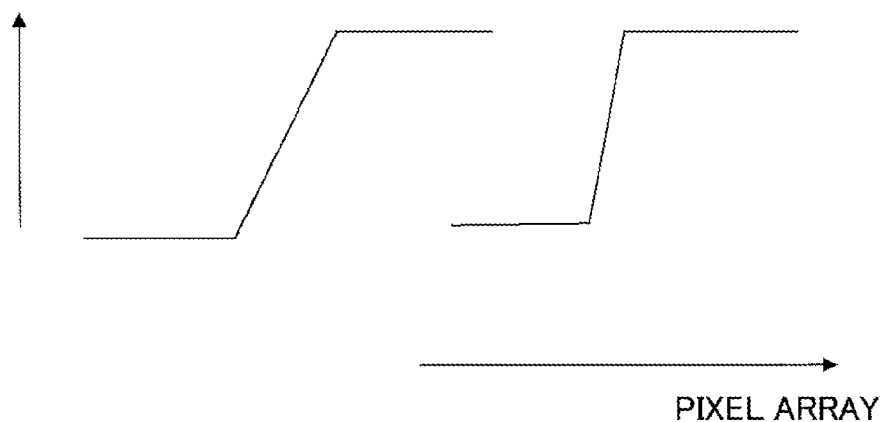
FIG. 34 is a diagram illustrating drastic luminance changes.

Initially, an outline of preventing the generation of the moiré pattern is described. FIG. 34 is a diagram illustrating drastic luminance changes. In FIG. 34, parts (e.g., rectangular parts) illustrating the drastic luminance changes include various high frequency components.

As described above, the moiré pattern is generated because different high frequency information may be lost in different directions by making the spatial filter having resolution anisotropy finite. That is, the moiré pattern is generated since levels of the correction (i.e., correcting degrees) of frequency deterioration differ in different directions.

Hence, the parts exhibiting drastic luminance changes may be reduced and the difference in the levels of the correction (i.e., correcting degrees) of the high frequency information between the different directions may be reduced by causing the image to pass through a finite high-pass filter. Accordingly, generation of the moiré pattern due to frequency information deterioration in the different directions may be prevented.

Figure 35:
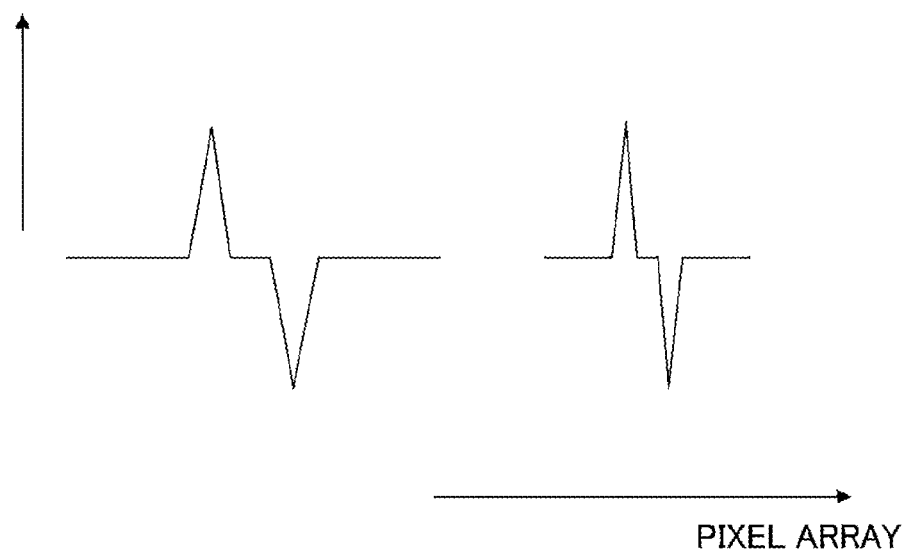
FIG. 35 is a diagram illustrating luminance changes after the image is passed through a high-pass filter.

FIG. 35 is a diagram illustrating luminance changes after the image is passed through a high-pass filter. The example illustrated in FIG. 35 illustrates a resultant state after the luminance changes illustrated in FIG. 34 are differentiated twice.

Note that the finite high-pass filter may be a finite filter having the sumb of elements being 0, and at least two of the elements being non-0. In the following, the finite high-pass filter may be described as an example of the finite filter.

Next, an image pickup apparatus including the image processing apparatus according to the first embodiment is illustrated. In the first embodiment, when making the finite spatial filter having resolution anisotropy, the generation of the moiré pattern may be prevented by convolving the finite high-pass filter.

Configuration

Figure 36:
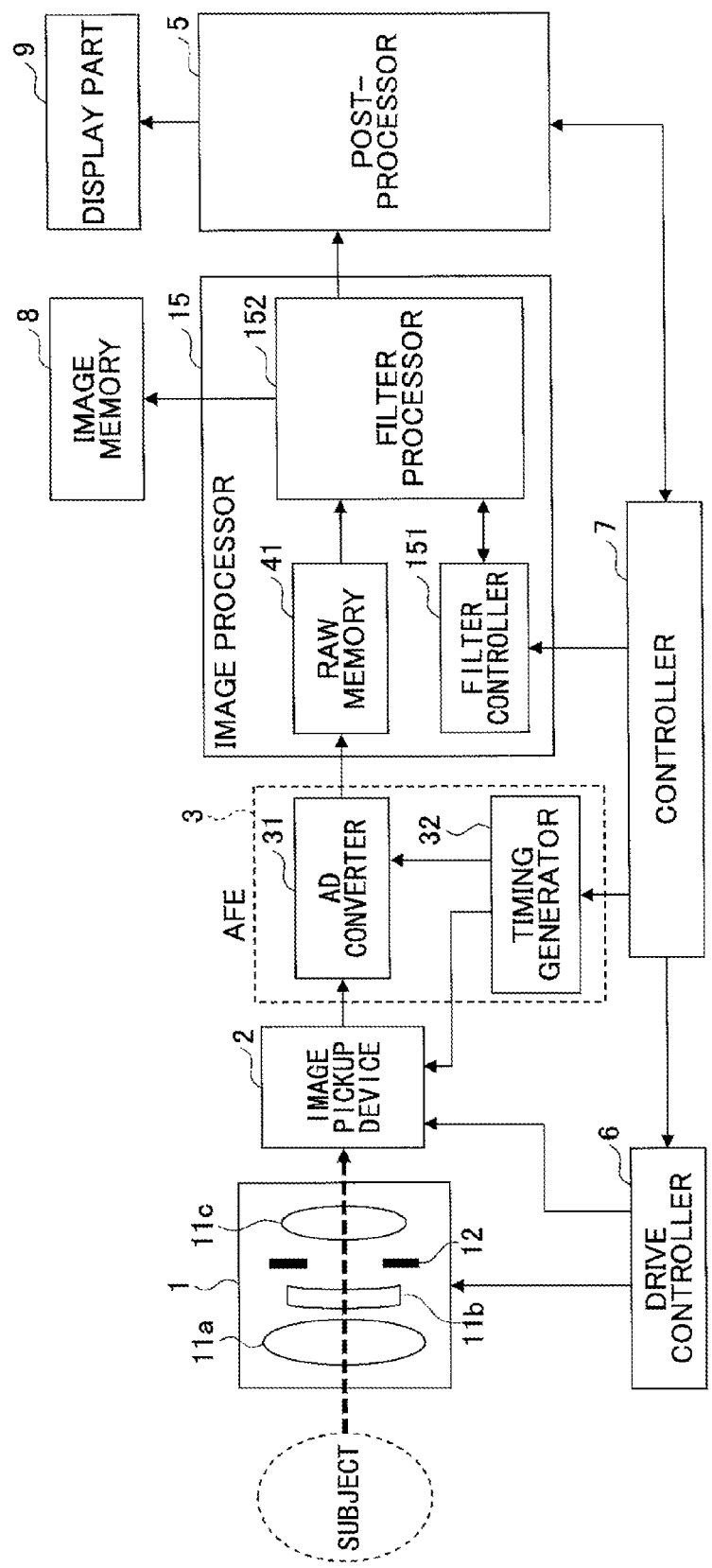
FIG. 36 is a block diagram illustrating a schematic configuration example of an image pickup apparatus including an image processing apparatus according to a first embodiment.

FIG. 36 is a block diagram illustrating a schematic configuration example of an image pickup apparatus including the image processing apparatus according to the first embodiment. In the configuration illustrated in FIG. 36, elements similar to those of the configuration illustrated in FIG. 21 are provided with the same reference numerals. In the following, an image processor 15 in the first embodiment is mainly described.

The image processor 15 includes a RAW memory 41, a filter controller 151, and a filter processor 152. The filter controller 151 maintains the spatial filter table illustrated in FIG. 28. The filter controller 151 is configured to convolve a finite high-pass filter with respect to each of the spatial filters in the spatial filter table. The filter controller 151 outputs the spatial filter having the high-pass filter convolved to the filter processor 152. That is, the filter controller 151 outputs to the filter processor 152 each of the spatial filters corresponding to the positions of the image to be processed.

The filter processor 152 executes filtering at the respective positions of the image utilizing the finite spatial filters acquired from the filter controller 151. This may improve the different resolution anisotropy at the respective positions of the image to prevent the generation of the moiré pattern, which may result in improving the image quality.

Filter Controller and Filter Processor

Figure 37:
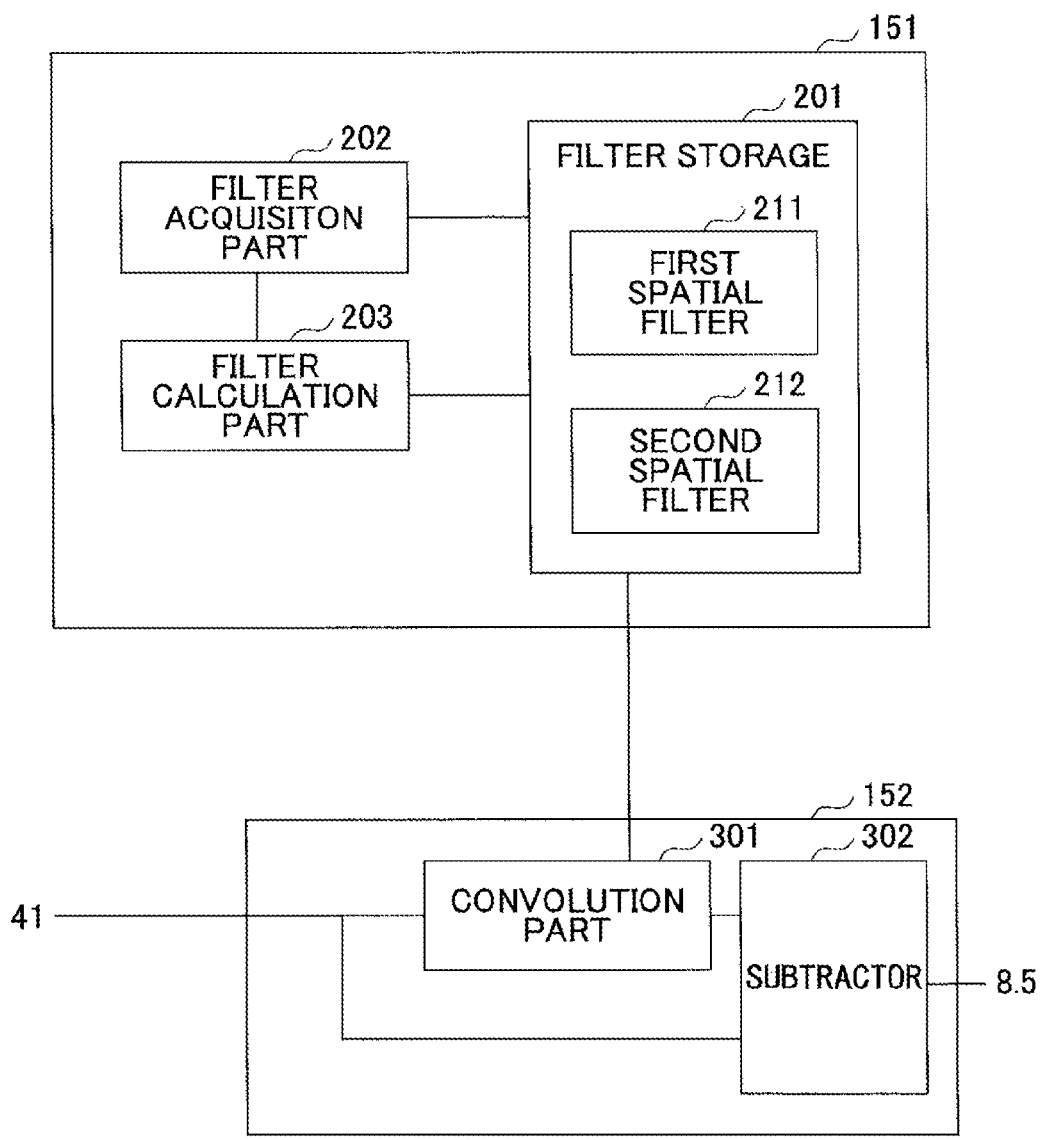
FIG. 37 is a block diagram illustrating a schematic configuration example including a filter controller and a filter processor according to the first embodiment.

Next, the filter controller 151 and the filter processor 152 in the first embodiment are illustrated. FIG. 37 is a block diagram illustrating a schematic configuration example including the filter controller 151 and the filter processor 152 according to the first embodiment. Initially, the filter controller 151 is illustrated. The filter controller 151 includes a filter storage 201, a filter acquisition part 202, and a filter calculation part 203.

The filter storage 201 is configured to store a first spatial filter 211, and a second spatial filter 212. The respective filters may be stored in different storage regions of the filter storage 201. The first spatial filter 211 serves as a spatial filter having resolution anisotropy. The first spatial filter 211 may, for example, be each of the filters in the spatial filter table illustrated in FIG. 28. The second spatial filter 212 serves as a filter computed by the filter calculation part 203. The second spatial filter 212 may, for example, be obtained by convolving a high-pass filter with the first spatial filter 211.

The filter acquisition part 202 is configured to acquire a finite spatial filter having image resolution anisotropy. The filter acquisition part 202 may, for example, acquire the first spatial filter 211 from the filter storage 201. The filter acquisition part 202 outputs the acquired first spatial filter 211 to the filter calculation part 203.

The filter calculation part 203 is configured to compute the second spatial filter 212 by convolving a finite filter having the sum of elements being 0 and at least two of the elements being non-0 with respect to the first spatial filter 211 that is acquired from the filter acquisition part 202. The filter calculation part 203 may, for example, compute the second spatial filter 212 by convolving a finite high-pass filter with the first spatial filter 211.

The filter calculation part 203 retains the finite high-pass filters in advance. The finite high-pass filter may, for example in a case of a 3×3 filter, be computed by the following formula (21) or (22).

$$Lap = \begin{bmatrix} 0 & 1 & 0 \\ 1 & -4 & 1 \\ 0 & 1 & 0 \end{bmatrix} \quad (21)$$

$$Lap = \begin{bmatrix} 1 & 1 & 1 \\ 1 & -8 & 1 \\ 1 & 1 & 1 \end{bmatrix} \quad (22)$$

Since the filter according to any angles of directions processes the anisotropy in the embodiment, it is preferable that all the elements of the filter each have non-0 coefficient.

When the high-pass filter is 3×3, the filter calculation part 203 may, for example, determine the spatial filter $k_{inv}$ as 7×7 so as to compute a 9×9 filter by convolving the two filters (i.e., the 3×3 high-pass filter and the 7×7 spatial filter). As described above, the filter calculation part 203 computes a desired filter (i.e., 9×9 filter in this case) having a desired number of taps by convolving the high-pass filter and the spatial filters.

Note that the 7×7 spatial filter is represented by $F_7$, and the high-pass filter is represented by Lap, and the 9×9 filter F9 computed by the filter calculation part 203 may be represented by the following formula (23).

$$F_9 = Lap \otimes F_7 \quad (23)$$

Figure 38:
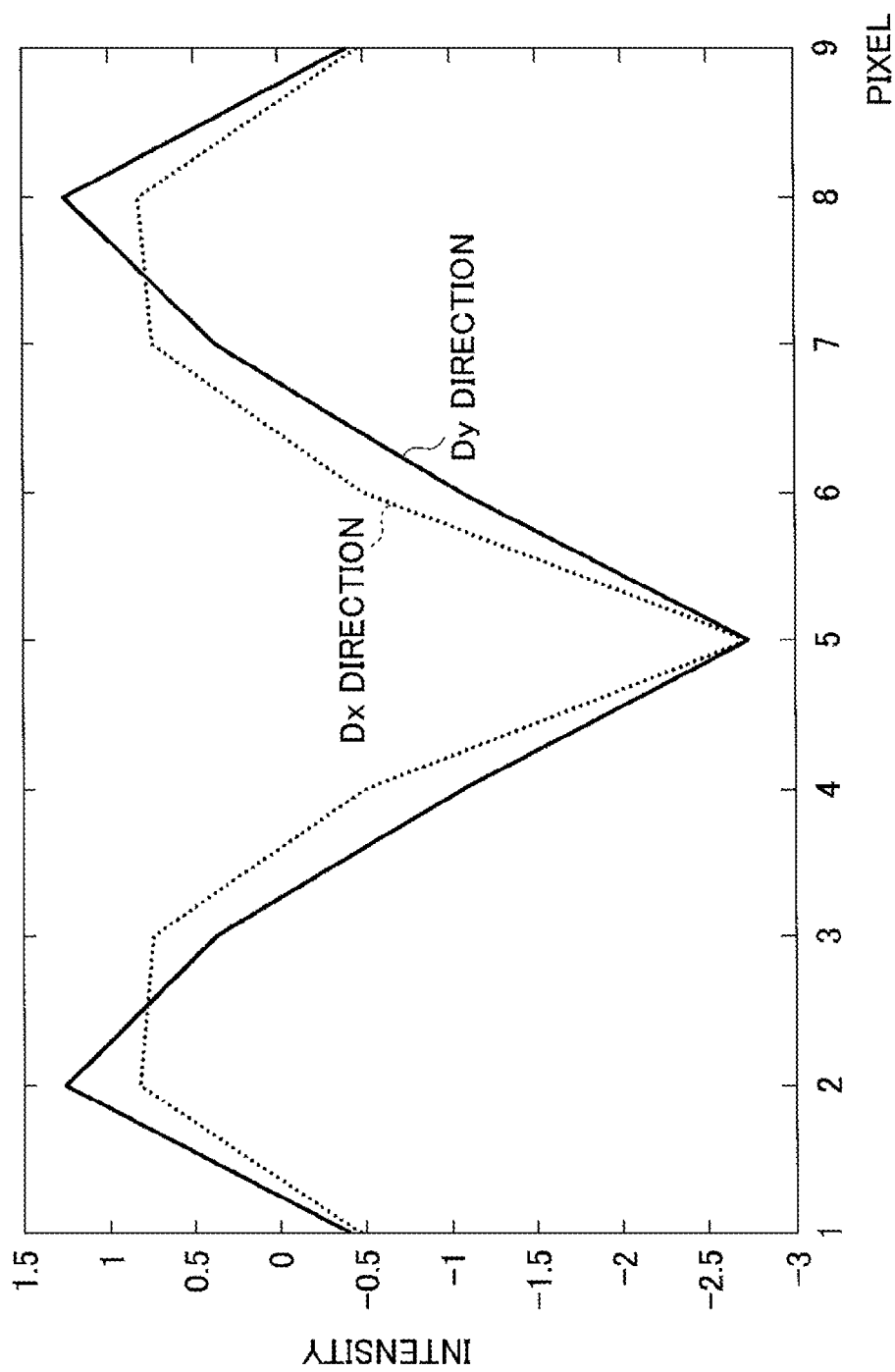
FIG. 38 is a diagram illustrating intensity of each of pixels in a finite spatial filter $F_9$.
Figure 39:
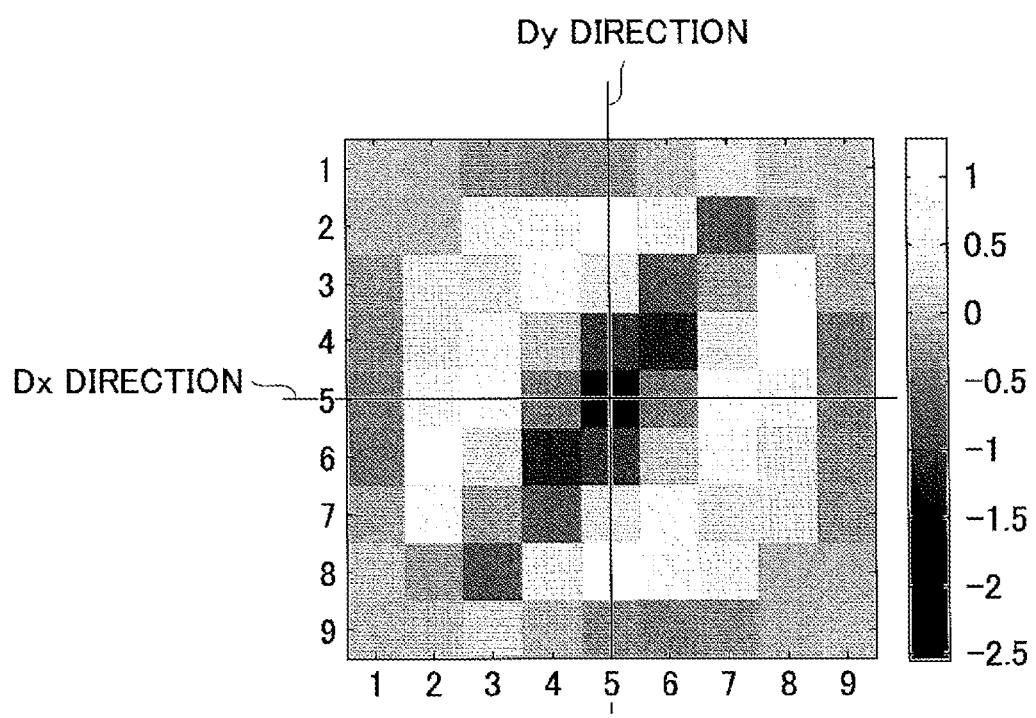
FIG. 39 is a diagram illustrating intensity of each of pixels in the finite spatial filter $F_9$.

FIG. 38 is a diagram illustrating intensity (a first example) of each of pixels in the finite spatial filter $F_9$. The example illustrated in FIG. 38 indicates the intensity change between the two directions (i.e., the horizontal direction Dx, the vertical direction Dy) of the finite spatial filter. FIG. 39 is a diagram illustrating intensity (a second example) of each of pixels in the finite spatial filter $F_9$. In the example illustrated in FIG. 39, the intensity of each of the pixels is expressed by a different color. As illustrated in FIGS. 38 and 39, since an extra amount of correction will not be applied to parts exhibiting drastic luminance change, it may be possible to make stable correction in the parts exhibiting the drastic luminance change.

The filter calculation part 203 stores the second spatial filter $F_9$ computed by the aforementioned formula (23) into the filter storage 201.

Note that the filter calculation part 203 may be provided in a separate apparatus, and hence, the second spatial filter 212 computed by the separate apparatus may be stored in the filter controller 151.

Referring back to FIG. 37, the filter controller 152 is illustrated. The filter controller 152 includes a convolution part 301, and a subtracter 302. The convolution part 301 is configured to acquire an image from the RAW memory 41, and convolve the image by the second spatial filter $F_9$ to perform a filter process on the image. The convolution part 152 outputs the filter-processed image to the subtracter 302.

The subtracter 302 subtracts the filter-processed image from the image acquired from the RAW memory 41 to generate the corrected image. Note that when x represents the corrected image, and y represent the original image, the following formula (24) is established.

$$x = y - F_9 \otimes y \qquad (24)$$

Figure 40:
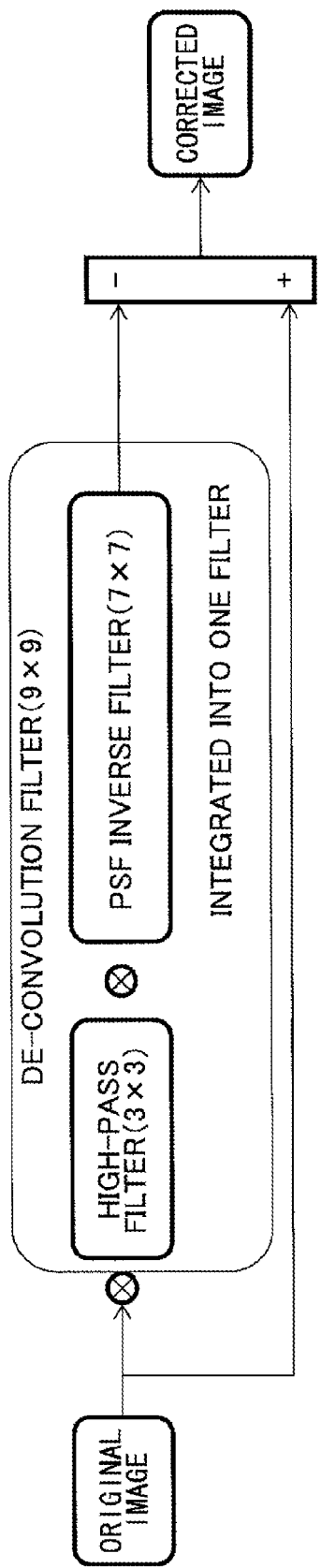
FIG. 40 is a diagram illustrating an image (a concept) of a correcting process according to the first embodiment.

FIG. 40 is a diagram illustrating an image (a concept) of a correcting process according to the first embodiment. As illustrated in FIG. 40, the filter processor 152 performs a deconvolution filter process on the original image, and generates the corrected image by subtracting the filter-processed image from the original image. The original image is acquired from the RAW memory 41, and the deconvolution filter is the finite spatial filter $F_9$.

Note that the filter processor 152 may be configured not to utilize one spatial filter corresponding to each pixel in each of the regions of the image, but may instead perform linear interpolation utilizing neighboring spatial filters to compute a pixel value of the focused-on pixel.

Figure 41:
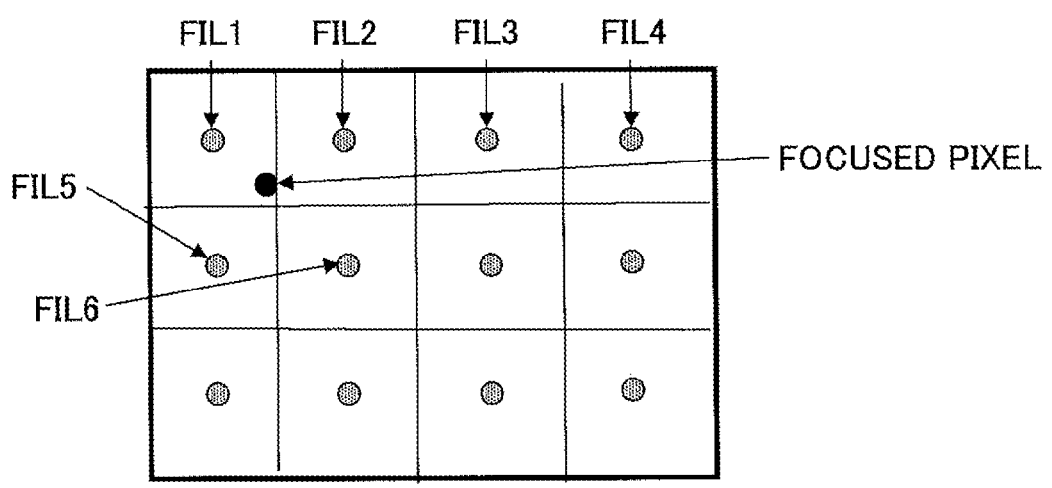
FIG. 41 is a diagram illustrating linear interpolation of a focused-on pixel.

FIG. 41 is a diagram illustrating the linear interpolation of the focused-on pixel. As illustrated in FIG. 41, the filter processor 152 may, for example, perform linear interpolation according to a distance of each of the pixels by utilizing the central pixel of each of the regions computed by four neighboring spatial filters so as to compute a pixel value of the focused-on pixel. In the example illustrated in FIG. 41, the filter processor 152 linearly interpolates the pixel values of the regions respectively computed by FIL1, FIL2, FIL5, and FIL6 to compute the pixel value of the focused-on pixel.

Alternatively, the filter processor 152 may compute the pixel value of the focused-on pixel after computing the spatial filters themselves with respect to the focused-on pixel by performing linear interpolation. Further, in the above example, the number of neighboring spatial filters is four; however, the number of neighboring spatial filters is not limited to four. The number of neighboring spatial filters may be any number other than four. In addition, in the above example, the distance is subjected to linear interpolation; however, any other interpolation methods may be performed. Moreover, the interpolation may be performed on each of the further segmented regions or each of the pixels.

Effect

Figure 42:
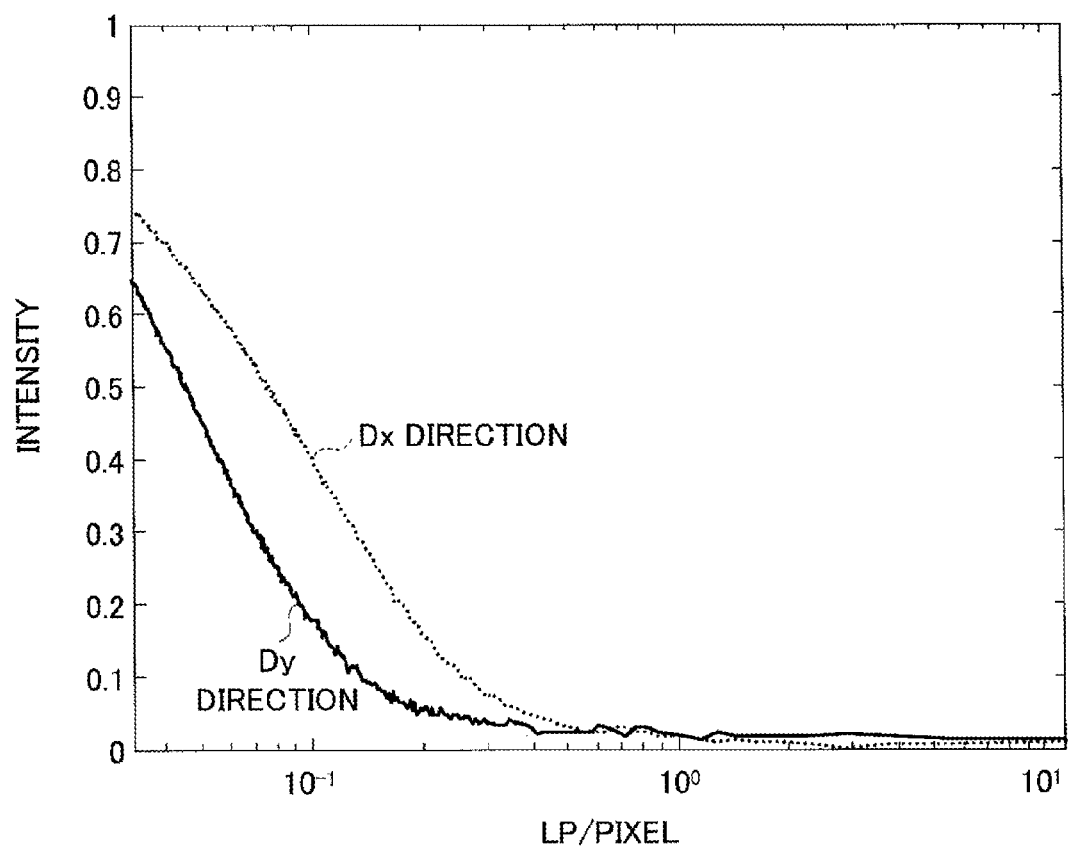
FIG. 42 is a diagram illustrating a resolution analysis result before the image correction.

Next, an advantageous effect of employing the above-described spatial filter $F_9$ is described. FIG. 42 is a diagram illustrating a resolution analysis result before the image correction. As illustrated in FIG. 42, the resolution in the Dy direction exhibits deterioration greater than the resolution in the Dx direction.

Figure 43:
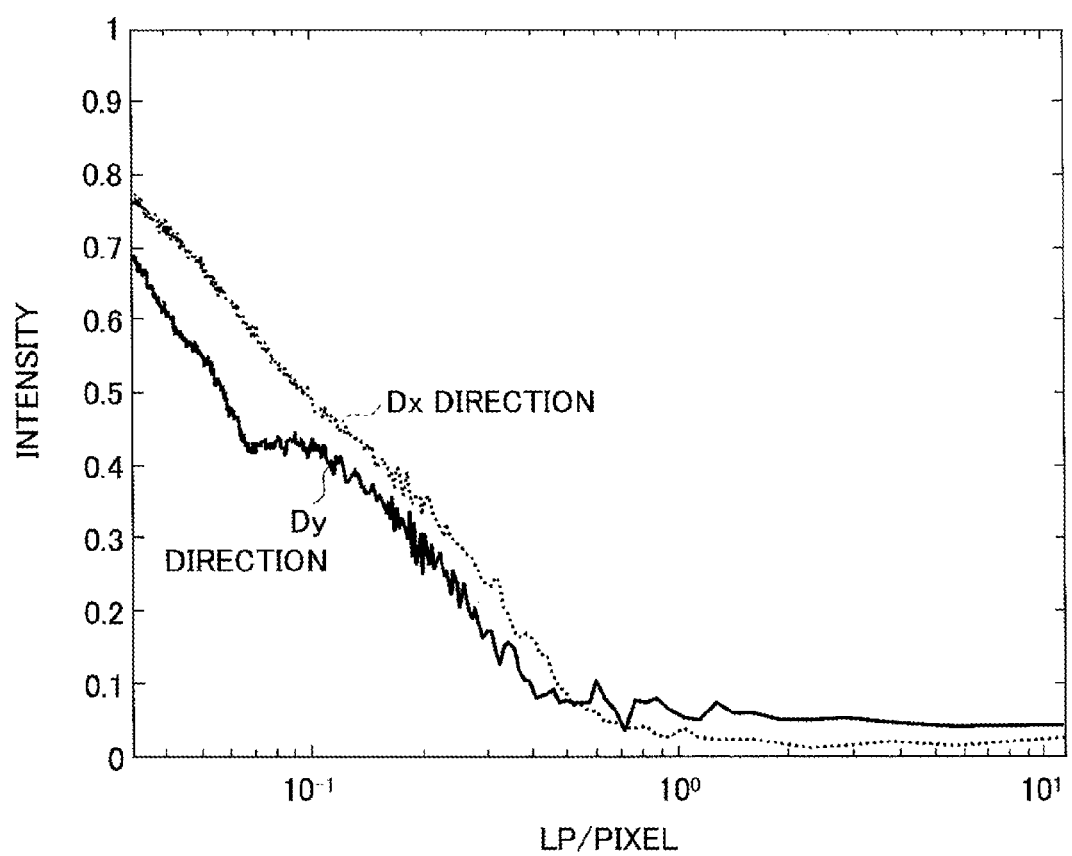
FIG. 43 is a diagram illustrating a resolution analysis result after the image correction according to the first embodiment.

FIG. 43 is a diagram illustrating a resolution analysis result after the image correction according to the first embodiment. The example illustrated in FIG. 43 employs the finite spatial filter $F_9$. As illustrated in FIG. 43, the resolutions in the Dx and Dy directions are both improved, and the difference in the resolution between the Dx and Dy directions is decreased.

Accordingly, FIG. 43 illustrates that the resolution anisotropy is improved. Further, the resolution analysis result in FIG. 43 illustrates that the generation of the moiré pattern is prevented by the reduction in the drastic luminance change.

Operations

Figure 44:
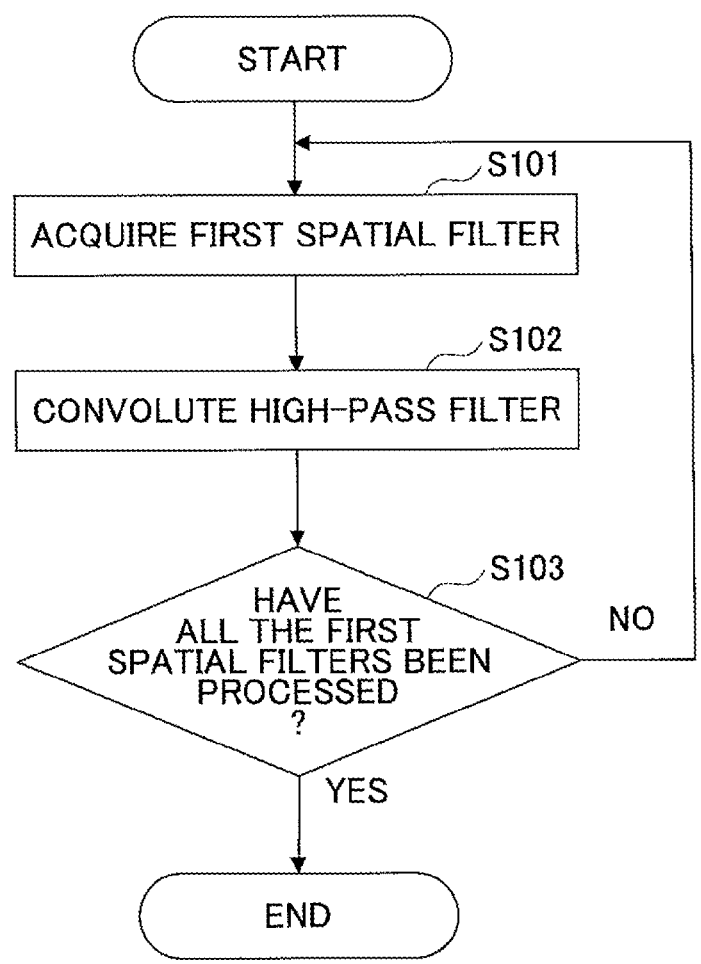
FIG. 44 is a flowchart illustrating an example of a filter computation process according to the first embodiment.

Next, operations of the image processor 15 according to the first embodiment are illustrated. FIG. 44 is a flowchart illustrating an example of a filter computation process according to the first embodiment.

In step S101, the filter acquisition part 202 acquires the first spatial filter 211 from the filter storage 201.

In step S102, the filter calculation part 203 convolves a finite high-pass filter with the first spatial filter 211.

In step S103, the filter acquisition part 151 determines whether all the filters of the first spatial filter 211 stored in the filter storage 201 have been processed. When all the filters of the first spatial filter 211 have been processed ("YES" in step S103), the filter computation process is ended, whereas when all the filters of the first spatial filter 211 have not been processed ("NO" in step S103), step S101 is processed (back to step S101).

Accordingly, the second spatial filter 212 may be generated by convolving the high-pass filter with the first spatial filter 211 at respective positions of the image.

Figure 45:
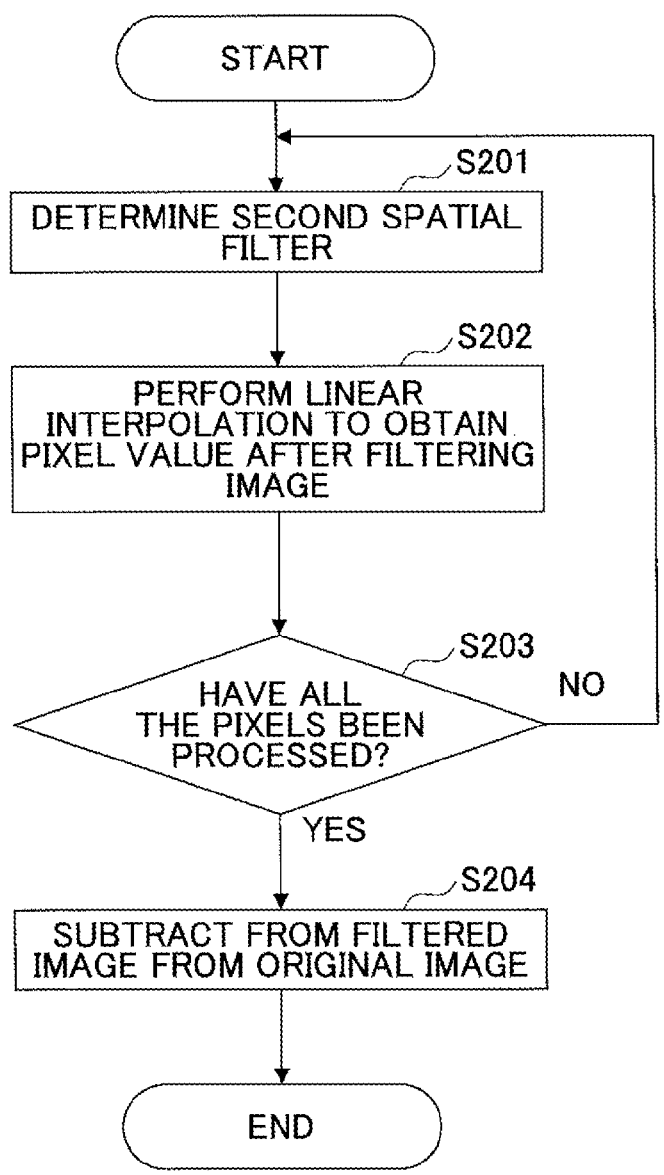
FIG. 45 is a flowchart illustrating an example of a filter process according to the first embodiment.

FIG. 45 is a flowchart illustrating an example of a filter process according to the first embodiment. In step S201 illustrated in FIG. 45, the convolution part 301 determines the second spatial filter according to a position of a region of the image to be processed.

In step S202, the convolution part 301 computes pixels of the regions of the image to be processed utilizing the determined filter. At this moment, the filter processor 152 computes a pixel value, after the filter process has been performed, at a focused-on position within the region by performing linear interpolation.

In step S203, the convolution part 301 determines whether the correction has been performed on all the pixels. When the correction has been performed on all the pixels ("YES" in step S203), step S204 is processed, whereas when the correction has been performed not on all the pixels ("NO" in step S203), step S201 is processed (back to step S201).

In step S204, the subtracter 302 subtracts a filter-processed image from the original image to generate a corrected image.

Accordingly, the corrected image may be generated by preventing the generation of the moiré pattern while improving the resolution anisotropy.

Second Embodiment

Next, an image pickup apparatus having an image processing apparatus according to a second embodiment is illustrated. In the second embodiment, the filter process is simplified despite exhibiting an advantageous effect similar to that obtained in the first embodiment.

Configuration

The image pickup apparatus according to the second embodiment is given with the same reference numeral as that given to the image pickup apparatus according to the first embodiment since the image pickup apparatus according to the second embodiment is similar to the image pickup apparatus according to the first embodiment.

Filter Controller and Filter Processor

Figure 46:
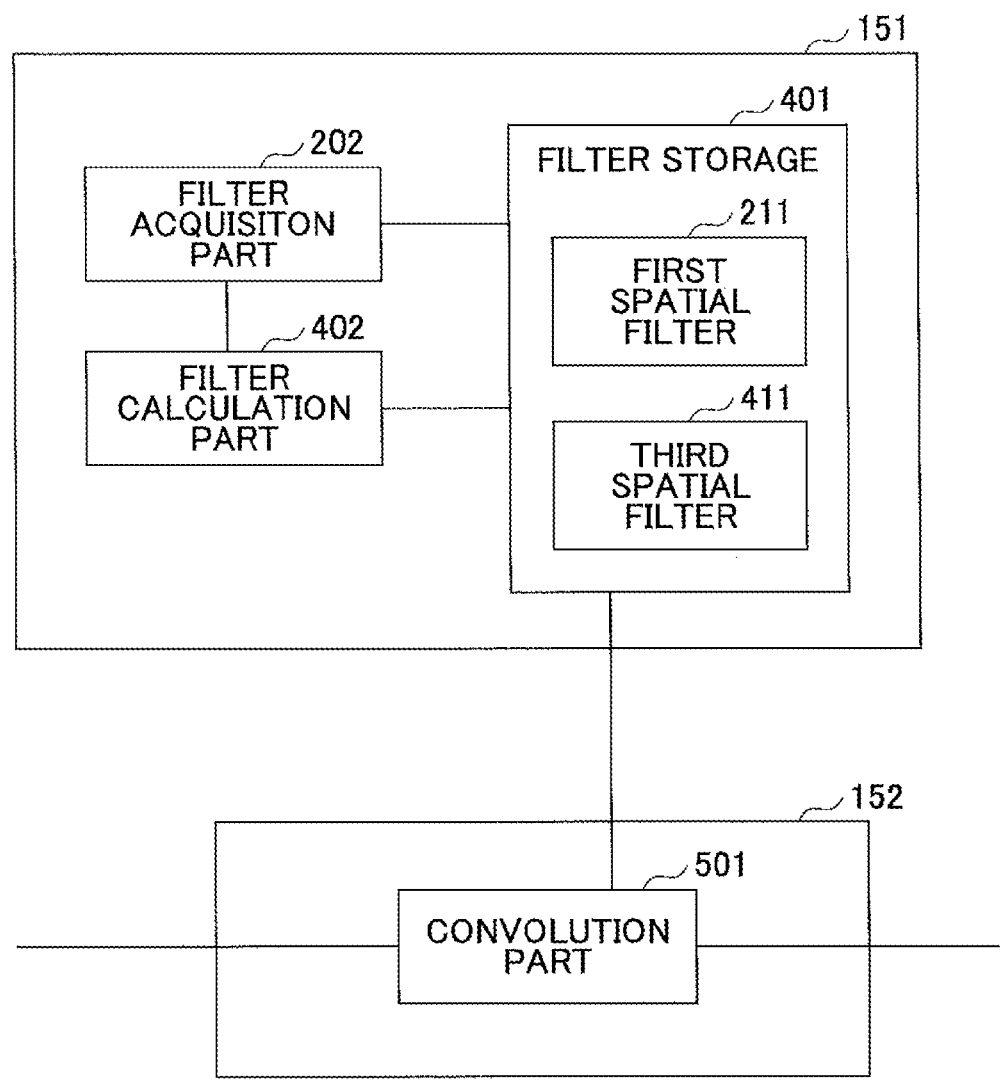
FIG. 46 is a block diagram illustrating a schematic configuration example including a filter controller and a filter processor according to a second embodiment.

Next, a filter controller 151 and a filter processor 152 in the second embodiment are illustrated. FIG. 46 is a block diagram illustrating a schematic configuration example including the filter controller 151 and the filter processor 152 according to the second embodiment. Initially, the filter controller 151 is illustrated. The filter controller 151 includes a filter storage 401, a filter acquisition part 202, and a filter calculation part 402.

In configuration illustrated in the second embodiment, elements similar to those of the configuration illustrated in the first embodiment are provided with the same reference numerals.

The filter storage 401 is configured to store a third spatial filter 411 computed by the filter calculation part 402.

The filter calculation part 402 is configured to compute the third spatial filter 411 that omits a subtraction process between the images in the first embodiment. The subtraction process may be omitted by modifying the formula as follows.

Note that in the following formula (25), a filter $I_0$ having the center representing "1" is employed.

$$I_0 = \begin{bmatrix} 0 & \cdots & 0 \\ \vdots & 1 & \vdots \\ 0 & \cdots & 0 \end{bmatrix} \quad (25)$$

When the formula (24) is modified with the formula (25), the following formula (26) is obtained.

$$x = I_0 \otimes y - F_9 \otimes y = (I_0 - F_9) \otimes y \quad (26)$$

Next, $F'_9$ is defined by the following formula (27).

$$F'_9 = I_0 - F_9 \quad (27)$$

When the formula (26) is modified with the formula (27), the following formula (28) is obtained.

$$x = F'_9 \otimes y \quad (28)$$

Accordingly, the result similar to that of the first embodiment may be obtained, thereby generating a finite spatial filter that omits the subtraction process between the images.

The filter calculation part 402 is configured to compute the spatial filter $F'_9$ represented by the formula (27). The filter calculation part 402 is further configured to write the computed spatial filter $F'_9$ in the filter storage 401. The spatial filter $F'_9$ is the third spatial filter 411.

Figure 47:
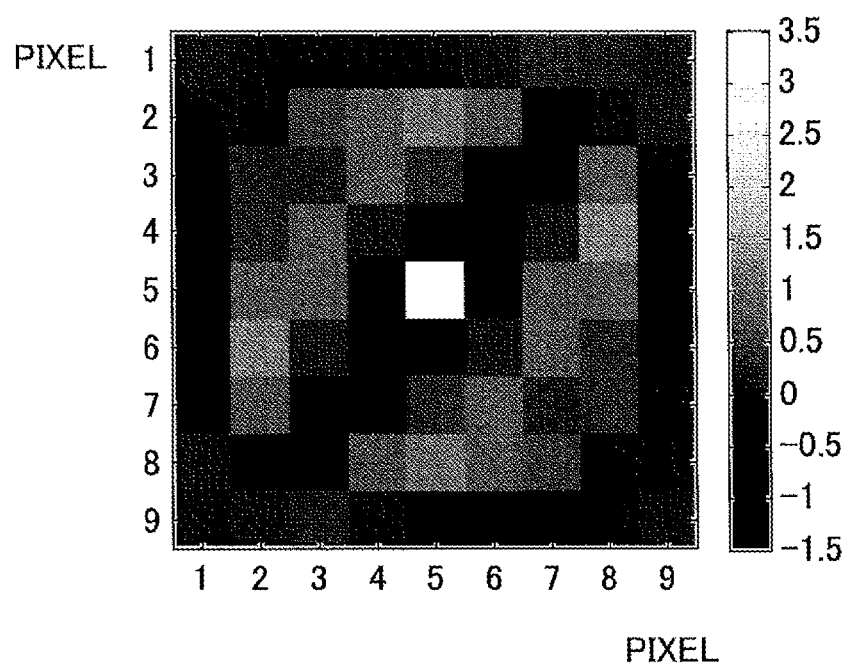
FIG. 47 is a diagram illustrating intensity of each of pixels in a finite spatial filter $F'_9$.

FIG. 47 is a diagram illustrating intensity of each of pixels in the finite spatial filter $F'_9$. In the example illustrated in FIG. 47, the intensity of each of the pixels is expressed by a different color.

Referring back to FIG. 46, the filter controller 152 in the second embodiment is illustrated. The filter controller 152 includes a convolution part 501. The convolution part 501 performs the process indicated by the formula (28) to generate the corrected image x.

Figure 48:
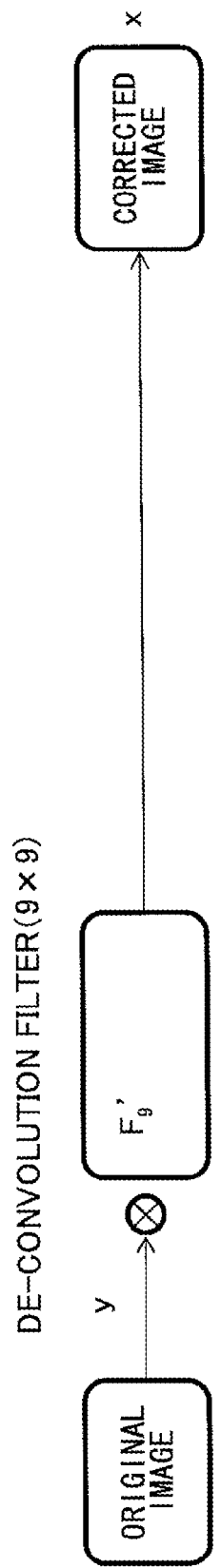
FIG. 48 is a diagram illustrating an image (a concept) of a correcting process according to the second embodiment.

FIG. 48 is a diagram illustrating an image (a concept) of a correcting process according to the second embodiment. As illustrated in FIG. 48, the filter processor 152 performs a deconvolution filter process on the original image to generate the corrected image. The original image is acquired from the RAW memory 41, and the deconvolution filter is the finite spatial filter $F'_9$.

Note that the filter processor 152 may be configured not to utilize one spatial filter corresponding to each pixel in each of the regions of the image, but may instead perform linear interpolation utilizing neighboring spatial filters to compute a pixel value of the focused-on pixel in a manner similar to the first embodiment.

Effect

The second embodiment omits the subtracting process between the images and simply modifies the formula. Hence, an advantageous effect similar to that of the first embodiment may be obtained.

Operations

Figure 49:
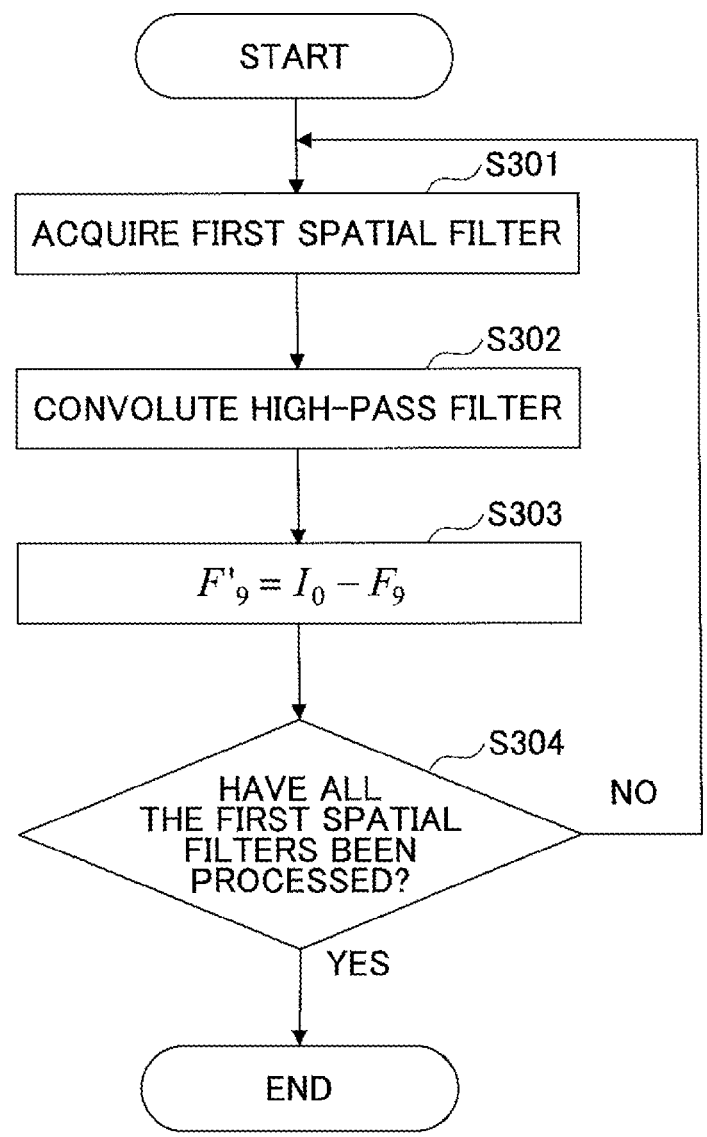
FIG. 49 is a flowchart illustrating an example of a filter computation process according to the second embodiment.

Next, operations of the image processor 15 according to the second embodiment are illustrated. FIG. 49 is a flowchart illustrating an example of a filter computation process according to the second embodiment.

In step S301, the filter acquisition part 202 acquires a first spatial filter 211 from the filter storage 401.

In step S302, the filter calculation part 402 convolves a finite high-pass filter with the first spatial filter 211.

In step S303, the filter calculation part 402 computes the third spatial filter $F'_9$ based on the formula (27).

In step S304, the filter acquisition part 151 determines whether all the filters of the first spatial filter 211 stored in the filter storage 401 have been processed. When all the filters of the first spatial filter 211 have been processed ("YES" in step S304), the filter computation process is ended, whereas when all the filters of the first spatial filter 211 have not been processed ("NO" in step S304), step S301 is processed (back to step S301).

Accordingly, the third spatial filter $F'_9$ may be generated by convolving the high-pass filter with the first spatial filter 211 at respective positions of the image and then subtracting the convolved filter from the filter $I_0$.

Figure 50:
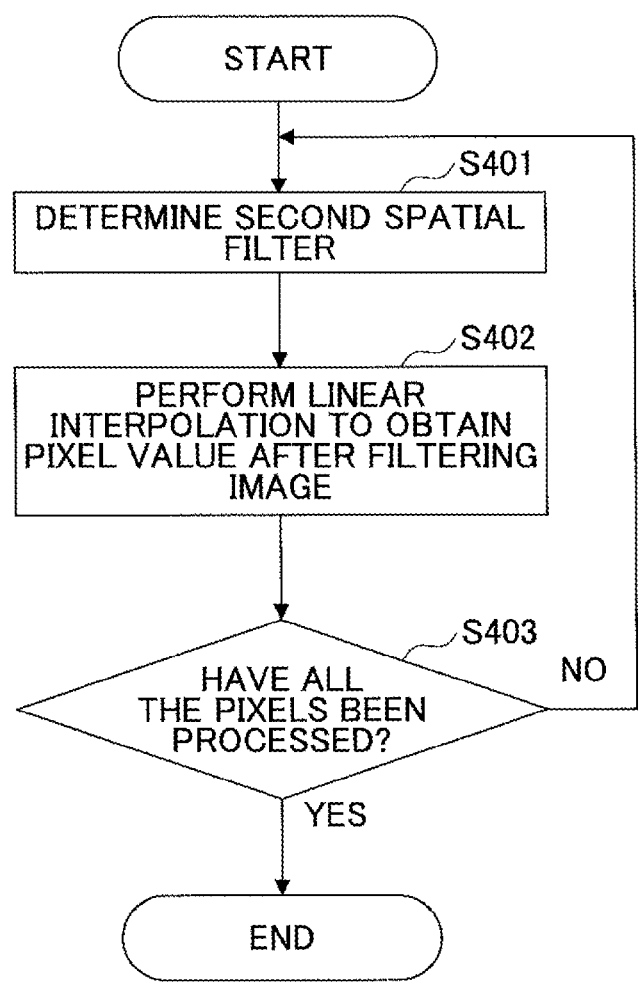
FIG. 50 is a flowchart illustrating an example of a filter process according to the second embodiment.

FIG. 50 is a flowchart illustrating an example of a filter process according to the second embodiment. In step S401 illustrated in FIG. 50, the convolution part 501 determines the third spatial filter according to a position of a region of the image to be processed.

In step S402, the convolution part 501 computes pixels of the region of the image to be processed utilizing the determined filter. At this moment, the filter processor 152 computes a pixel value, after the filter process has been performed, at a focused-on position within the region by performing linear interpolation.

In step S403, the convolution part 501 determines whether the correction has been performed on all the pixels. When the correction has been performed on all the pixels ("YES" in step S403), the filter process is ended, whereas when the correction has been performed not on all the pixels ("NO" in step S403), step S401 is processed (back to step S401).

Accordingly, the corrected image may be generated by preventing the generation of the moiré pattern while improving the resolution anisotropy in a manner similar to the first embodiment.

Third Embodiment

Figure 51:
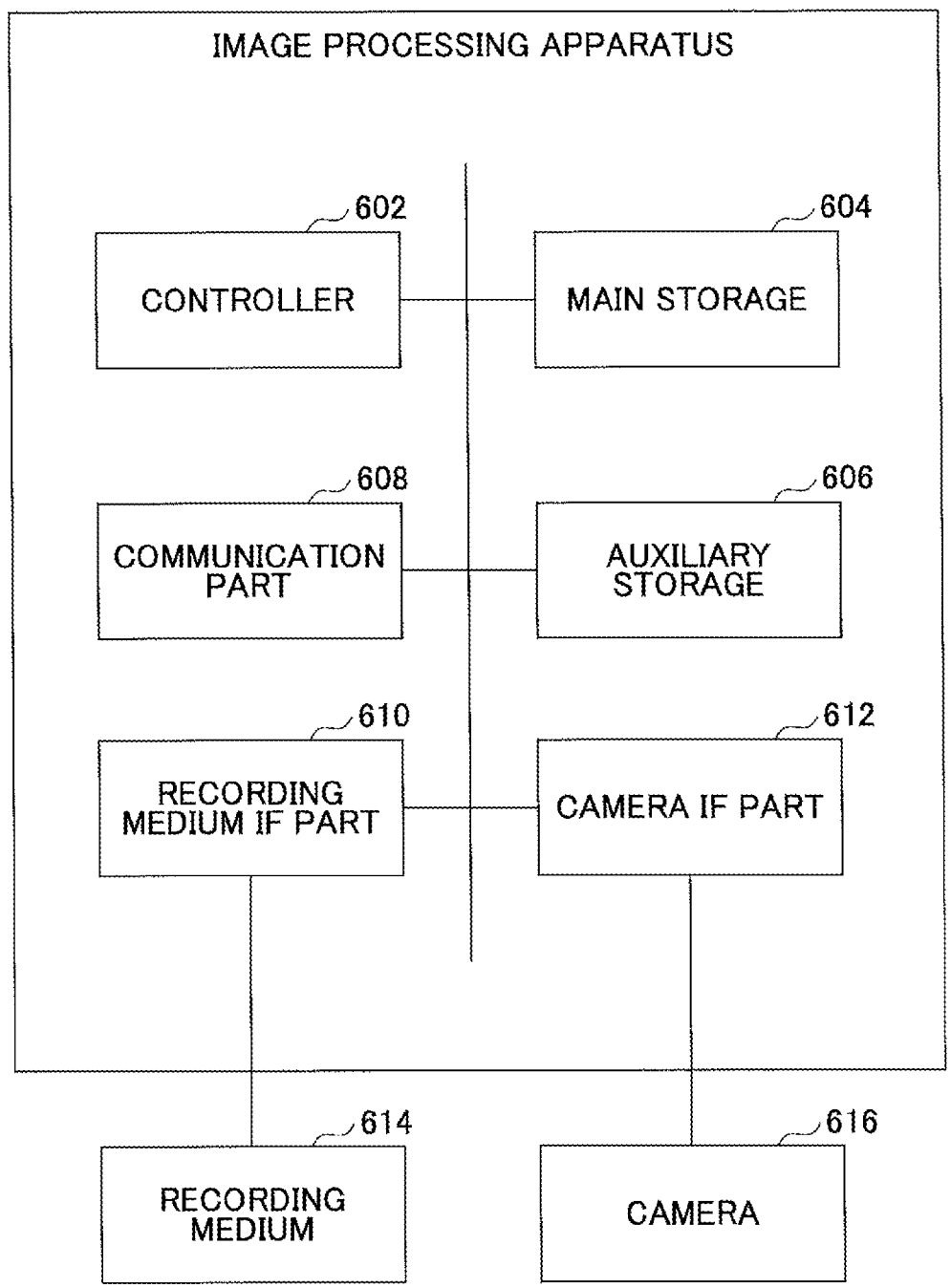
FIG. 51 is a block diagram illustrating a schematic configuration example of an image processing apparatus according to a third embodiment.

Next, an image processing apparatus according to a third embodiment is described. In the third embodiment, a CPU (central processing unit), a DSP (digital signal processor), or the like may perform respective processes of the aforementioned coefficient analysis part 10 and the image processor 15 in the first or the second embodiment Configuration FIG. 51 is a block diagram illustrating a schematic configuration example of the image processing apparatus according to the third embodiment. The image processing apparatus illustrated in FIG. 51 includes a controller 602, a main storage 604, an auxiliary storage 606, a communication part 608, a recording medium IF part 610, and a camera IF part 612. The above parts of the image processing apparatus according to the third embodiment are connected with one another via a bus such that they are configured to mutually transmit or receive data with one another via the bus. The image processing apparatus according to the third embodiment may be an apparatus having an information processing function such as a PC (personal computer) or a server, a smartphone, or a tablet terminal.

The controller 602 may serve as a CPU (central processing unit), or the like configured to perform controls of the various devices or operations or manipulation of data within a computer. The controller 602 may also serve as an operating unit configured to execute programs stored in the main storage 604 or the auxiliary storage 606.

The controller 602 may, for example, implement the above-described processes by executing a program for performing a coefficient analysis process or an image process stored in the auxiliary storage 606.

The main storage 604 may, for example, be a ROM (read only memory) and a RAM (random access memory) serving as a storage device configured to store or temporarily store programs to be executed by the controller 602 such as an OS (operating system) that is basic software and application software.

The auxiliary storage 606 may be a HDD (hard disk drive), or the like serving as a storage device configured to store data associated with the application software, and the like. The auxiliary storage 606 may also store programs for performing the coefficient analysis process or the image process acquired from a recording medium 614.

The communication part 608 may perform wired or wireless communications. The communication part 608 may, for example, acquire plural images from a server, and store the acquired images in the auxiliary storage 608, or the like.

A recording medium IF (interface) part 610 is configured to serve as an interface between a recording medium 614 (e.g., a flash memory) connected via a transmission channel such as a USB (universal serial bus) and the image processing apparatus.

Further, a predetermined program stored in the recording medium 614 may be installed in the image processing apparatus via the recording medium IF part 610. The predetermined installed program may be executable by the image processing apparatus.

The camera IF part 612 is configured to serve an interface for performing communications with a camera 616. The camera IF part 612 acquires from the camera 616 the chart images captured by the camera 616 or normal images subject to correction and stores the acquired images in the auxiliary storage 606.

The camera 616 is configured to capture the chart images illustrated in FIG. 6, or normal landscapes or individuals. The captured images are incorporated into the image processing apparatus via the camera IF part 612. Note that the camera 616 may be embedded in the image processing apparatus.

Hence, the image processing apparatus may be able to acquire the chart image to compute spatial filters at respective positions, and correct the image subject by utilizing the computed spatial filters.

Accordingly, programs for implementing the above-described coefficient analysis process and the image process may be stored in the recording medium, which may cause a computer to implement the above-described coefficient analysis process and image process.

The above programs may, for example, be recorded on the recording medium, allowing the computer, a mobile terminal, a smartphone, or a tablet terminal to read the programs from the recording medium, thereby implementing the above-described coefficient analysis process and image process.

Note that various types of recording media may be used as the above recording medium, examples of which include a recording medium optically, electronically or magnetically recording information such as a CR-ROM (compact disk read-only memory), a flexible disk, and a magneto-optical disk, or semiconductor memory or the like electrically recording information such as a ROM (read-only memory), a flash memory or the like. Such media do not include non-transitory media such as a carrier wave.

Figure 52:
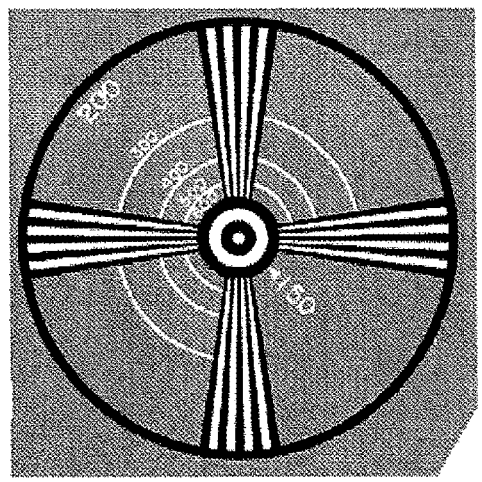
FIG. 52 is a diagram illustrating an example of a chart (a first example)
Figure 53:
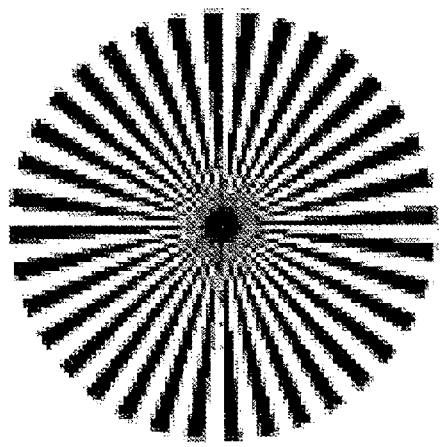
FIG. 53 is a diagram illustrating an example of a chart (a second example)
Figure 54:
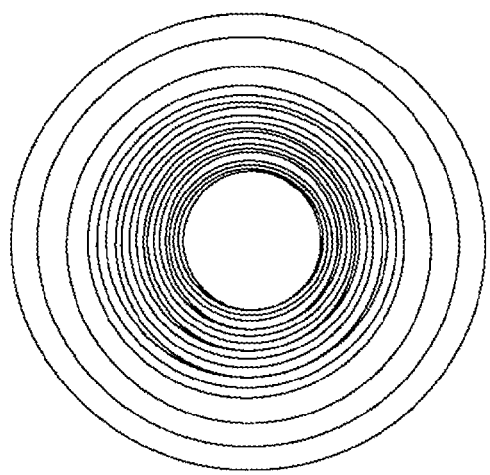
FIG. 54 is a diagram illustrating an example of a chart (a third example).

Further, charts illustrated in FIGS. 52 to 54 may be employed as examples of the chart. FIG. 52 is a diagram illustrating an example of the chart (a first example). The resolution of the chart illustrated in FIG. 52 may be analyzed at least in two directions.

FIG. 53 is a diagram illustrating another example of the chart (a second example). The resolution of the chart illustrated in FIG. 53 may be analyzed in all radial directions. The chart illustrated in FIG. 53 is suitable for the resolution analysis.

FIG. 54 is a diagram illustrating another example of the chart (a third example). The chart illustrated in FIG. 54 has a difference in the resolution between its central part and its peripheral part. The chart illustrated in FIG. 53 (i.e., the second example) may be suitable for the resolution analysis according to the embodiments; however, the analysis of the resolution anisotropy may be conducted on the charts illustrated in FIG. 52 (i.e., the first example) and in FIG. 54 (i.e., the third example)

According to the technology disclosed above, the generation of the moiré pattern may be prevented when a spatial filter having resolution anisotropy is limited to a finite spatial filter.

As described above, the examples and embodiments of the image processing apparatus, the image pickup apparatus, the information processing method, and the non-transitory recording medium storing a program for performing the information processing method have been described in detail; however, it should not be construed that the present invention is limited to those specific examples and embodiments described above. Various changes or alternations may be made within the scope of the invention. Further, all or parts of the elements recited in the embodiments may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:
1. An image processing apparatus, comprising:
an acquisition unit configured to acquire a first finite spatial filter having image resolution anisotropy in which an image resolution varies as a function of separation and direction relative to a center of an image; and
a calculation unit configured to compute a second spatial filter by convolving a finite high-pass filter with respect to the first finite spatial filter, the finite high-pass filter having a sum of elements being 0 and at least two of the elements being non-0, the second spatial filter being smaller than the first finite spatial filter and the finite high-pass filter.

2. The image processing apparatus as claimed in claim 1, wherein
the finite high-pass filter is a high-pass filter having all the elements being non-0 coefficients.

3. The image processing apparatus as claimed in claim 1, wherein
the calculation unit computes a third spatial filter by subtracting the second spatial filter from a filter having a central element being 1 and elements other than the central element being 0.

4. The image processing apparatus as claimed in claim 1, further comprising:
a filter processor configured to perform a filter process on an input image utilizing the second spatial filter and subtract a filter-processed image from the input image to generate a corrected image.

5. The image processing apparatus as claimed in claim 3, further comprising:
a filter processor configured to perform a filter process on an input image utilizing the second spatial filter to generate a corrected image.

6. An image pickup apparatus, comprising:
the image processing apparatus as claimed in claim 1; and
an image pickup unit.

7. A non-transitory computer-readable storage medium that stores a program which, when executed by a processor, causes a computer to perform a process comprising:
acquiring a first finite spatial filter having image resolution anisotropy in which an image resolution varies as a function of separation and direction relative to a center of an image; and
computing a second spatial filter by convolving a finite high-pass filter with respect to the first finite spatial filter, the finite high-pass filter having a sum of elements being 0 and at least two of the elements being non-0, the second spatial filter being smaller than the first finite spatial filter and the finite high-pass filter.

8. An information processing method executed by a computer, the information processing method comprising:
acquiring a first finite spatial filter having image resolution anisotropy in which an image resolution varies as a function of separation and direction relative to a center of an image; and
computing a second spatial filter by convolving a finite high-pass filter with respect to the first finite spatial filter, the finite high-pass filter having a sum of elements being 0 and at least two of the elements being non-0, the second spatial filter being smaller than the first finite spatial filter and the finite high-pass filter.

* * * * *